US012353508B2

(12) United States Patent
Daga et al.

(10) Patent No.: US 12,353,508 B2
(45) Date of Patent: Jul. 8, 2025

(54) SYSTEM AND METHOD FOR SWEET SPOT DETECTION

(71) Applicant: STR8BAT SPORTS TECH SOLUTIONS PTE. LTD., Manhattan House (SG)

(72) Inventors: Gagan Daga, Bangalore (IN); Rahul Nagar, Bangalore (IN); Sanjiv Soni, Bangalore (IN); Kasi Viswanadh Sripada, Tekkali (IN)

( * ) Notice: Subject to any disclaimer, the term of this patent is extended or adjusted under 35 U.S.C. 154(b) by 692 days.

(21) Appl. No.: 17/320,765

(22) PCT Filed: Nov. 14, 2019

(86) PCT No.: PCT/IN2019/050839
§ 371 (c)(1),
(2) Date: May 14, 2021

(87) PCT Pub. No.: WO2020/100163
PCT Pub. Date: May 22, 2020

(65) Prior Publication Data
US 2022/0096905 A1 Mar. 31, 2022

(30) Foreign Application Priority Data

Nov. 14, 2018 (IN) .............................. 201841042720

(51) Int. Cl.
A63B 60/46 (2015.01)
G06F 18/00 (2023.01)
A63B 102/20 (2015.01)
(52) U.S. Cl.
CPC .............. *G06F 18/00* (2023.01); *A63B 60/46* (2015.10); *A63B 2102/20* (2015.10);
(Continued)

(58) Field of Classification Search
CPC .............................. A63B 60/46; A63B 2102/20
See application file for complete search history.

(56) References Cited

U.S. PATENT DOCUMENTS 9,737,777 B2 * 8/2017 April ...................... G06F 1/1626
2014/0290332 A1 * 10/2014 Yamashita .............. G06F 3/043
73/11.01

(Continued)

FOREIGN PATENT DOCUMENTS

| GB | 2473658 A | * | 3/2011 | ............. A63B 59/00 |
| JP | 2012130414 A | * | 7/2012 | ......... A63B 24/0003 |
| WO | WO-2017210367 A1 | * | 12/2017 | ............. G08C 17/02 |

OTHER PUBLICATIONS

"Determination of the "Sweet Spot" of a Cricket Bat using COMSOL Multiphysics®"; Mulchand et al, 2016 (Year: 2016).*

(Continued)

*Primary Examiner* — Joshua T Kennedy
(74) *Attorney, Agent, or Firm* — Joy S Goudie

(57) ABSTRACT

A system including a data extraction module (DEM), a data tagging module (DTM), and a sweet spot detection module (SSDM) and a method for detecting a sweet spot on a bat are provided. A sensor device including multiple sensors is coupled to a rear surface of the bat. The sensors continuously record event-based data elements associated with multiple shots on multiple regions on the bat within a configurable time period. The DEM extracts and stores the event-based data elements. The DTM aggregates and tags each event-based data element based on a position of each shot at each region on the bat and feedback data regarding shot types. The SSDM detects and distinguishes a sweet spot shot from a non-sweet spot shot and an edge shot based on responses produced by the bat at each region during and after each shot is hit using the event-based data elements.

11 Claims, 31 Drawing Sheets

(52) U.S. Cl.
CPC ....... *A63B 2220/34* (2013.01); *A63B 2220/40* (2013.01); *A63B 2220/833* (2013.01); *A63B 2225/20* (2013.01)

(56) References Cited

U.S. PATENT DOCUMENTS

| | | | |
|---|---|---|---|
| 2015/0057112 A1* | 2/2015 | Sak | A63B 24/0003 473/461 |
| 2015/0241979 A1* | 8/2015 | Nakanishi | H04N 21/84 345/156 |
| 2017/0343410 A1* | 11/2017 | Pretorius | G01H 11/08 |
| 2019/0212356 A1* | 7/2019 | Wall | G01P 15/14 |

OTHER PUBLICATIONS

"ExIMUs: An Experimental Inertial Measurement Unit for Shock and Impact Detection in Sport Applications" Minakov et al; Nov. 18, 2016 (Year: 2016).*

* cited by examiner

| | AccX | AccY | AccZ | GyroX | GyroY | Time | PC | SN | Region | ResAcc | DiffResAcc |
|---|---|---|---|---|---|---|---|---|---|---|---|
| 0 | 0.170312 | -0.551928 | -0.850584 | -0.63 | -0.98 | 20866 | 1 | 1 | 3 | 1.028165 | NaN |
| 1 | 0.169336 | -0.552904 | -0.854000 | -1.05 | -0.98 | 20867 | 2 | 1 | 3 | 1.031355 | 0.003190 |
| 2 | 0.167872 | -0.555832 | -0.854976 | -0.42 | -0.84 | 20868 | 3 | 1 | 3 | 1.033496 | 0.002141 |
| 3 | 0.163480 | -0.558760 | -0.849120 | -0.56 | -0.91 | 20869 | 4 | 1 | 3 | 1.029535 | -0.003961 |
| 4 | 0.174216 | -0.551928 | -0.846680 | -0.14 | -0.70 | 20870 | 5 | 1 | 3 | 1.025594 | -0.003942 |
| 5 | 0.172752 | -0.560224 | -0.854488 | -0.42 | -0.70 | 20871 | 6 | 1 | 3 | 1.036264 | 0.010671 |
| 6 | 0.169824 | -0.559736 | -0.853512 | -0.28 | -1.19 | 20872 | 7 | 1 | 3 | 1.034711 | -0.001553 |
| 7 | 0.173240 | -0.554368 | -0.860344 | -0.28 | -0.91 | 20873 | 8 | 1 | 3 | 1.038040 | 0.003329 |
| 8 | 0.168360 | -0.551440 | -0.860344 | 0.07 | -0.84 | 20874 | 9 | 1 | 3 | 1.035675 | -0.002365 |
| 9 | 0.168360 | -0.555344 | -0.850584 | -0.07 | -0.98 | 20875 | 10 | 1 | 3 | 1.029682 | -0.005993 |

FIG. 6

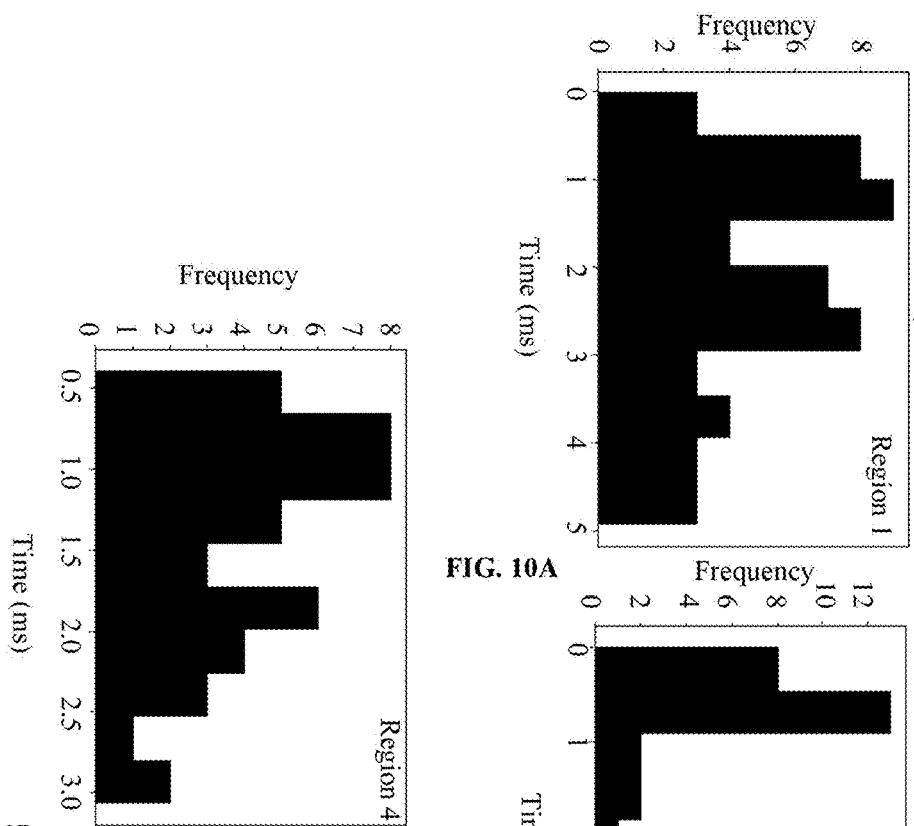
FIG. 10A
FIG. 10B
FIG. 10C
FIG. 10D
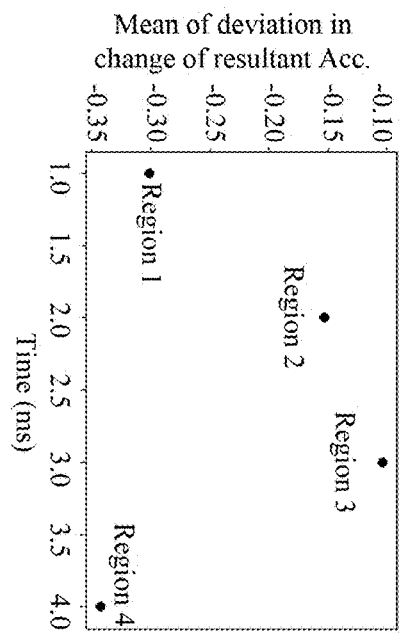
FIG. 11

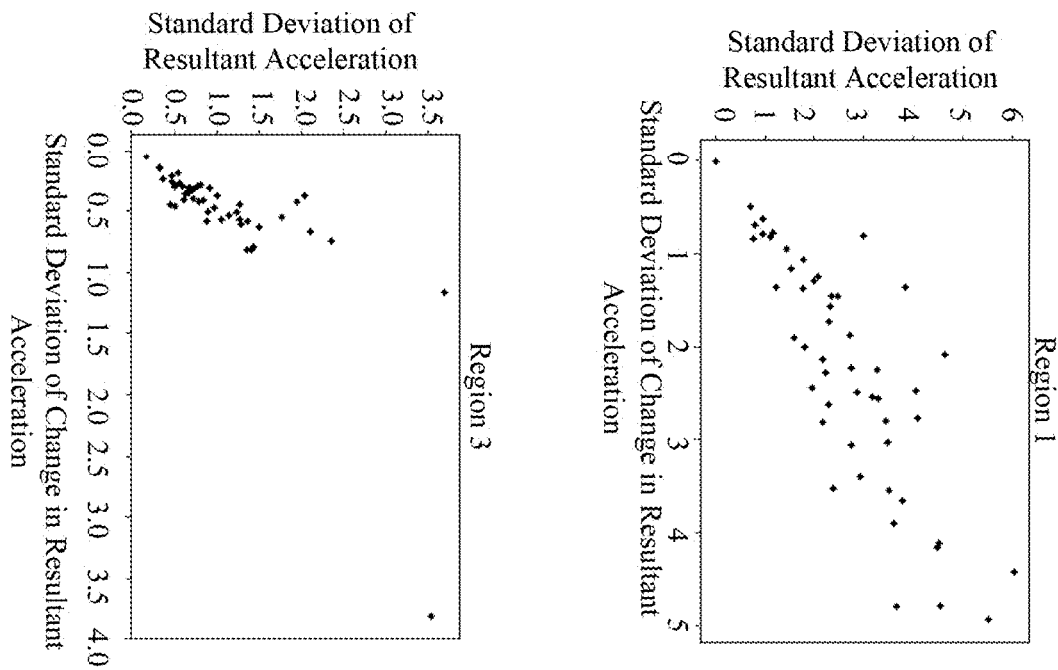
FIG. 12C
FIG. 12A
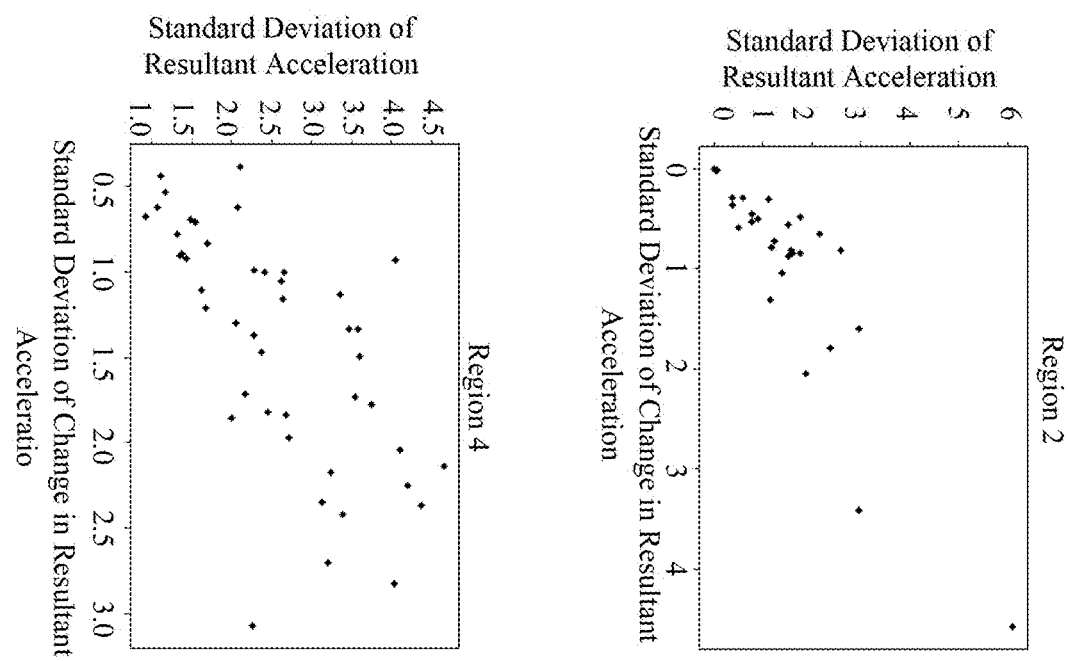
FIG. 12D
FIG. 12B

SYSTEM AND METHOD FOR SWEET SPOT DETECTION

CROSS-REFERENCE TO RELATED APPLICATIONS

The present application is a National Phase Application of the PCT application with the serial number PCT/IN2019/050839 filed on Nov. 14, 2019 with the title, "SYSTEM AND METHOD FOR SWEET SPOT DETECTION". The embodiments herein claim the priority of the Indian Provisional Patent Application with serial number IN 201841042720 filed on Nov. 14, 2018 with the title, "SYSTEM AND METHOD FOR SWEET SPOT DETECTION", and the contents of abovementioned Provisional Patent application and PCT applications are included entirely as reference herein.

BACKGROUND

Technical Field

The embodiments herein are generally related to sports. The embodiments herein are particularly related to sports that involve use of a bat for hitting an object, for example, a ball. The embodiments herein are more particularly related to a system and a method for detecting a sweet spot on a bat.

Description of the Related Art

With an advent of technology such as Internet of Things (IoT), artificial intelligence, and machine learning, a development of intelligent applications has steadily become a daily phenomenon. These techniques help humankind in automating processes in various fields. However, an application of these techniques in a field of sports is still not completely exploited and there is much scope for further development.

Cricket as a sport is popular worldwide and has generated a lot of interest in recent times. Many companies are coining up with technological advances that help players in improving their game in various aspects. Hitting a shot in sports such as cricket, baseball, etc., in a sub-second time period is one such aspect and is a key challenge in sports. Conventional systems, typically, analyse a swing motion of a bat that hits a ball using camera systems. However, these camera systems are not cost effective and portable as these camera systems are mostly confined to experimental lab systems. Moreover, setting up these camera systems and analyzing each shot hit by a player requires a substantial amount of manual effort and consumes a considerable amount of time, which makes it is difficult for players to analyse their shots in real time on a field while playing or training and receive real time or near real time insights on the type of shot they have played. Analysis of the type of a shot hit by a player is typically performed by detecting a sweet spot on a bat. As used herein, "sweet spot" refers to an area or a spot or an impact point on the bat where a vibration of the bat is minimum and maximum energy is conveyed to a ball when the bat hits the ball. When a player hits the ball at a sweet spot region of the bat, the player experiences minimal force and jarring in the hands and forearms. The sweet spot region on the bat is an optimal area that provides maximum stroke power with the least amount of effort. Furthermore, a manual analysis of shots made by players of different builds using bats of different thicknesses using camera systems is time consuming, difficult, and mostly inaccurate.

Hence, there is a need for a portable system and a method for identifying a sweet spot on a bat and distinguishing a sweet spot shot from a non-sweet spot shot independent of the type and build of a player and irrespective of the type of bat used for playing a sport such as cricket. Moreover, there is a need for a system and a method for determining whether a ball has hit a sweet spot region on the bat. Furthermore, there is for providing a system and a method for sweet spot detection on a region of the bat, which is suitable for use on a field during training and coaching in a near instantaneous time period to provide feedback to the player in real time or near real time to correct an action or playing technique of the player. Furthermore, there is a need for providing a machine learning/statistical model-based system and method for identification of sweet spots.

The above-mentioned shortcomings, disadvantages, and problems are addressed herein and will be understood by reading and studying the following specification.

OBJECTS OF THE EMBODIMENTS HEREIN

A primary object of the embodiments herein is to provide a portable system and a method for identifying a sweet spot region on a bat and distinguishing a sweet spot shot from a non-sweet spot shot independent of the type and build of a player and irrespective of the type of bat used for playing a sport such as cricket.

Another object of the embodiments herein is to provide a system and a method for determining whether a ball, for example, a cricket ball, has hit a sweet spot region on the bat.

Yet another object of the embodiments herein is to provide a system and a method for sweet spot detection on a region of the bat, which is suitable for use on a field during training and coaching in a near instantaneous time period to provide feedback to the player in real time or near real time to correct an action or playing technique of the player.

Yet another object of the embodiments herein is to provide a machine learning/statistical model-based system and method for identification of sweet spots.

Yet another object of the embodiments herein is to provide a system and a method for sweet spot detection that also offers analysis and modelling of the data collected over time.

Yet another object of the embodiments herein is to provide a system for sweet spot detection that comprises a sensor device mounted on a rear surface of a bat for sensing vibrations occurring due to the impact of the ball at different spots and regions of the bat.

Yet another object of the embodiments herein is to provide a system and a method for sweet spot detection comprising a mobile application for collecting and tagging the sensed data to analyse different shots hit by a player.

Yet another object of the embodiments herein is to provide a system and a method for sweet spot detection to provide a feedback to a player instantaneously in real time or near real time to allow the player to correct an action and/or playing technique.

These and other objects and advantages of the embodiments herein will become readily apparent from the following detailed description taken in conjunction with the accompanying drawings.

SUMMARY

These and other aspects of the embodiments herein will be better appreciated and understood when considered in conjunction with the following description and the accompanying drawings. It should be understood, however, that the following descriptions, while indicating embodiments and numerous specific details thereof, are given by way of illustration and not of limitation. Many changes and modifications may be made within the scope of the embodiments herein without departing from the scope and spirit thereof, and the embodiments herein include all such modifications.

This summary is provided to introduce a selection of concepts in a simplified form that are further disclosed in the detailed description. This summary is not intended to determine the scope of the claimed subject matter.

The various embodiments herein provide a portable system and a method for identifying a sweet spot on a bat and distinguishing a sweet spot shot from a non-sweet spot shot independent of the type and build of a player and irrespective of the type of bat used for playing a sport such as cricket.

The various embodiments herein provide a portable system and a method for determining whether a ball, such as, a cricket ball, has hit a sweet spot on a bat. According to an embodiment herein, a machine learning/statistical model-based system and method are provided for identification of sweet spots.

According to an embodiment herein, the system comprises a sensor device, a non-transitory, computer-readable storage medium, at least one processor, and a plurality of modules configured to define computer program instructions for detecting a sweet spot on a bat. According to an embodiment herein, the plurality of modules comprises a data extraction module, a data tagging module, and a sweet spot detection module embedded in any one of the sensor devices, the user device, and the sweet spot detection server.

According to an embodiment herein, a system and method for determining whether the cricket ball has hit the sweet spot on the bat or not using a highly portable system. The system comprises a sensor device mounted on the back side of a bat. The sensor device is operably coupled to a rear surface of the bat. The sensor device comprises a plurality of sensors configured to continuously record a plurality of event-based data associated with a plurality of shots on a plurality of regions on the bat within a configurable time period in real time or near real time. The plurality of event-based data comprises, acceleration and angular velocity of the bat while the bat is in motion and vibrations generated on the bat after each of the plurality of shots. Each of the plurality of shots comprises an impact of the ball on the bat and is represented, in an embodiment, in terms of acceleration in three dimensions and angular velocity in three axes. The plurality of shots comprises, sweet spot shots, non-sweet spot shots, and edge shots.

According to an embodiment herein, the system comprises a sensor device mounted on the back side of a bat. The sensor device comprises an accelerometer sensor, a magnetometer sensor, a gyroscope sensor, a temporary storage, a microcontroller and a transceiver. The sensor device is configured for continuously recording event-based data and filtering the live stream data which is being produced by the sensors. The sensor records the snapshot around the impact of ball with the bat. The data around a point reference point (a point in time where ball hits the bat) is collected which is also called as a ball impact point. The collected data is stored in the temporary storage (e.g. a circular buffer) which gets filled with latest data at one end and is cleared on the other. The collected data is then transmitted to a mobile device.

According to an embodiment herein, the sensor device comprises an accelerometer, a gyroscope, and a magnetometer. The accelerometer is configured to measure an amount of force exerted on the ball by the bat during a swing of the bat. The gyroscope is configured to measure a rate of rotation of the bat. The magnetometer is configured to measure a direction, a strength, and a relative change of a magnetic field at each of the plurality of regions on the bat. According to an embodiment herein, the plurality of modules comprises a noise filter configured to filter out noise from the plurality of event-based data elements. The sensor device is communicatively coupled to a user device and a sweet spot detection server via a network. The non-transitory, computer-readable storage medium, such as, a memory unit, is configured to store the plurality of event-based data elements and the computer program instructions defined by the plurality of modules. The processor is operably and communicatively coupled to the non-transitory, computer-readable storage medium and configured to execute the computer program instructions defined by the plurality of modules.

According to an embodiment herein, the data extraction module is configured to extract and store the plurality of event-based data elements received from the plurality of sensors of the sensor device. According to an embodiment herein, the data tagging module is configured to aggregate and tag each of the plurality of event-based data elements based on a position of each of the plurality of shots at each of the plurality of regions on the bat where a ball is hit and feedback data received from a player who hit the ball with the bat.

According to an embodiment herein, the sweet spot detection module is configured to classify each of the plurality of shots into a first part, a second part, and a third part. The first part lies in a time duration before the ball hits the bat when the bat gains momentum till the ball is hit or missed. The second part is a time instance when the ball collides with the bat. The third part lies in a time duration when the bat loses momentum and attempts to return to rest. According to an embodiment herein, the sweet spot detection module is configured to process the plurality of regions on the bat in waits of a first region, a second region, a third region, and a fourth region. The first region is located proximal to a handle and a shoulder of the bat. The second region is located proximal to the first region and the shoulder of the bat. That is, the second region is a mid-top region on the bat. The third region is located proximal to the second region and a toe of the bat. That is, the third region is a mid-bottom region on the bat. The fourth region is located at the toe of the bat and proximal to the third region.

According to an embodiment herein, the sweet spot detection module is configured to identify responses produced by the bat at each of the plurality of regions during and after each of the plurality of shots is hit by analysing the plurality of event-based data elements.

According to an embodiment herein, the sweet spot detection module is configured to detect and distinguish a sweet spot shot from a non-sweet spot shot and an edge shot among the plurality of shots based on the responses from the sensors and a feedback from the players.

According to an embodiment herein, the sweet spot detection module is configured to compute a resultant acceleration of the bat during and after each of the plurality of shots for each of the plurality of regions, compute a change in the resultant acceleration of the bat after each of the plurality of shots for each of the plurality of regions using a statistical metric, and analyse a deviation in the resultant acceleration from a deviation in the change in the resultant acceleration of the bat associated with each of the plurality of shots for each of the plurality of regions. According to an embodiment herein, the statistical measure is standard deviation. According to an embodiment herein, the sweet spot detection module is configured to analyse the deviation in acceleration between two axes associated with each of the plurality of shots for each of the plurality of regions. According to an embodiment herein, the sweet spot detection module is configured to analyse the deviation in the resultant acceleration versus the deviation in the change in the resultant acceleration of the bat associated with each of the plurality of shots for each of the plurality of regions by generating one or more decision boundaries for clustering the plurality of shots and classifying each of the plurality of shots as a sweet spot shot, a non-sweet spot shot, and an edge shot.

According to an embodiment herein, the plurality of modules comprises a machine learning module configured to predict one or more of the plurality of regions on the bat where the sweet spot shot is detected using a statistical metric, such as, standard deviation, in three axes.

According to an embodiment herein, the related systems comprise circuitry and/or programming for effecting the methods disclosed herein. The circuitry and/or programming are any combination of hardware, software, and/or firmware configured to execute the methods disclosed herein depending upon the design choices of a system designer. According to an embodiment herein, a plurality of structural elements is employed depending on the design choices of the system designer.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments, those skilled in the art will recognize that the embodiments herein can be practised with modification within the scope of the appended claims.

BRIEF DESCRIPTION OF THE DRAWINGS

The other objects, features, and advantages will occur to those skilled in the art from the following description of the embodiments and the accompanying drawings in which:

FIG. 6 illustrates a table depicting time series data for acceleration in three dimensions and angular velocity in three axes with respect to a sensor frame along with metadata, according to an embodiment herein;

FIGS. 7A-7D illustrate graphs depicting resultant acceleration profiles versus time for shots hit on four regions of a bat, according to an embodiment herein;

FIGS. 10A-10D illustrate histograms depicting a continuous change in relative levels of a consecutive acceleration for shots hit across four regions of a bat, according to an embodiment herein;

FIG. 11 illustrates a graph depicting a trend of a deviation in a change of a resultant acceleration for shots hit on four regions of the bat, according to an embodiment herein;

FIGS. 12A-12D illustrate graphs depicting a deviation in a change of a resultant acceleration versus a resultant acceleration deviation for shots hit on four regions of the bat, according to an embodiment herein;

Figure 1:
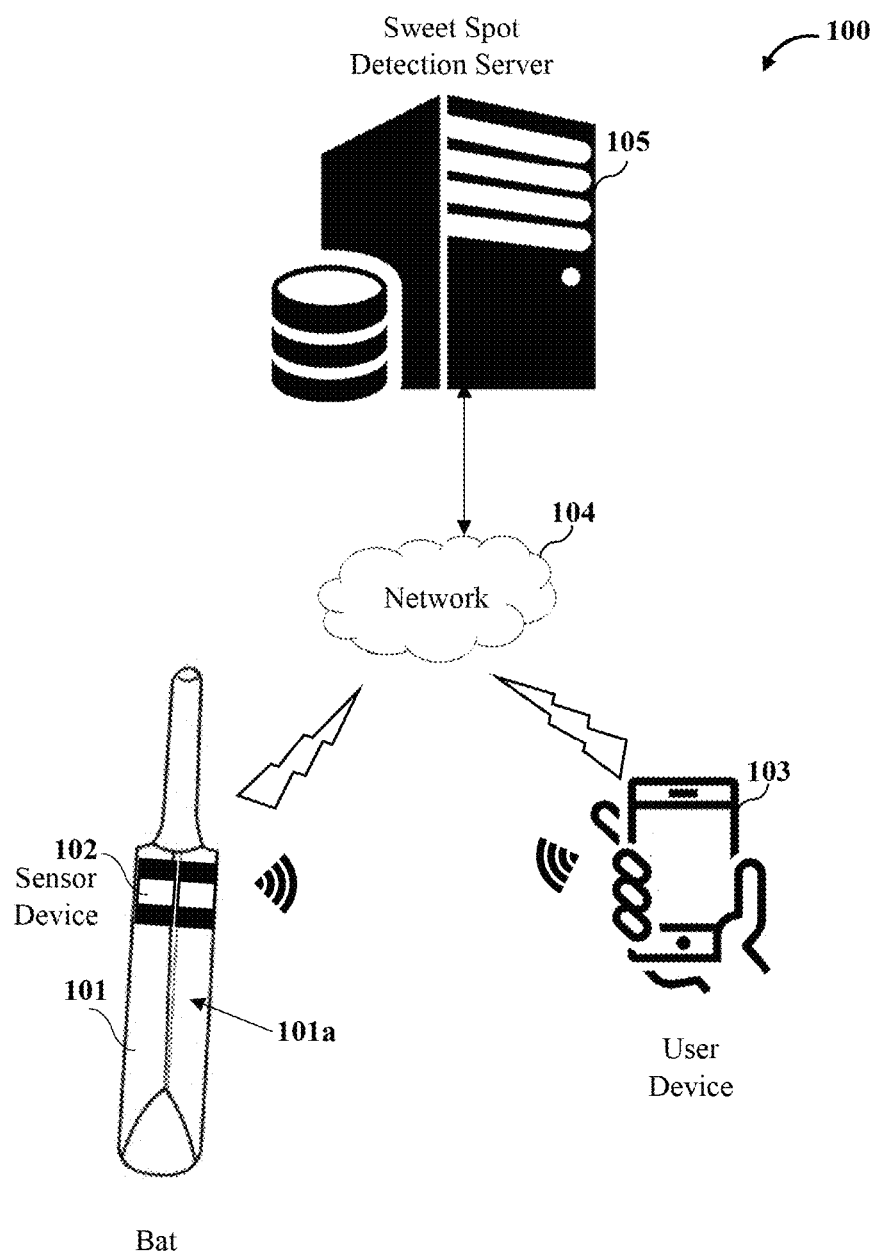
FIG. 1 illustrates a system for detecting a sweet spot on a bat, according to an embodiment herein.

The specific features of the embodiments herein are shown in some drawings and not in others for convenience only as each feature may be combined with any or all of the other features in accordance with the embodiments herein.

DETAILED DESCRIPTION

In the following detailed description, a reference is made to the accompanying drawings that form a part hereof, and in which the specific embodiments that may be practiced is shown by way of illustration. These embodiments are described with sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments herein provide a portable system and a method for detecting a sweet spot on a bat and distinguishing a sweet spot shot from a non-sweet spot shot independent of the type and build of a player and the type of bat used for playing a sport such as cricket. The various embodiments herein provide a portable system and a method for determining whether a ball has hit a sweet spot on a bat. The bat is, for example, any one of a cricket bat, a baseball bat, a tennis racket, a table tennis racket, a badminton racket, a hockey stick, etc., and the ball is, respectively, any one of a cricket ball, a baseball, a tennis ball, a table tennis ball, a shuttlecock, a hockey ball, etc.

According to an embodiment herein, a machine learning/statistical model-based system and method are provided for identification of sweet spots. According to an embodiment herein, the system comprises a sensor device, a non-transitory, computer-readable storage medium, at least one processor, and a plurality of modules configured to define computer program instructions for detecting a sweet spot on a bat. As used herein, "non-transitory, computer-readable storage medium" refers to all computer-readable media, for example, non-volatile media, volatile media, and transmission media, except for a transitory, propagating signal. Non-volatile media comprise, for example, solid state drives, optical discs or magnetic disks, flash memory cards, a read-only memory (ROM), etc. Volatile media comprise, for example, a register memory, a processor cache, a random-access memory (RAM), etc. Transmission media comprise, for example, coaxial cables, copper wire, fiber optic cables, modems, etc., including wires that constitute a system bus coupled to the processor. According to an embodiment herein, the plurality of modules comprises a data extraction module, a data tagging module, and a sweet spot detection module embedded in any one of the sensor devices, the user device, and the sweet spot detection server.

According to an embodiment herein, the sensor device is operably coupled to a rear surface of the bat. The sensor device comprises a plurality of sensors configured to continuously record a plurality of event-based data elements associated with a plurality of shots on a plurality of regions on the bat within a configurable time period in real time or near real time. The plurality of event-based data elements comprises, for example, acceleration and angular velocity of the bat while the bat is in motion and vibrations generated on the bat after each of the plurality of shots. Each of the plurality of shots comprises an impact of the ball on the bat and is represented, in an embodiment, in terms of acceleration in three dimensions and angular velocity in three axes. The plurality of shots comprises, for example, sweet spot shots, non-sweet spot shots, and edge shots. According to an embodiment herein, the sensor device comprises an accelerometer, a gyroscope, and a magnetometer. The accelerometer is configured to measure an amount of force exerted on the ball by the bat during a swing of the bat. The gyroscope is configured to measure a rate of rotation of the bat. The magnetometer is configured to measure a direction, a strength, and a relative change of a magnetic field at each of the plurality of regions on the bat. According to an embodiment herein, the plurality of modules comprises a noise filter configured to filter out noise from the plurality of event-based data elements. The sensor device is communicatively coupled to a user device and a sweet spot detection server via a network. The non-transitory, computer-readable storage medium, for example, a memory unit, is configured to store the plurality of event-based data elements and the computer program instructions defined by the plurality of modules. The processor is operably and communicatively coupled to the non-transitory, computer-readable storage medium and configured to execute the computer program instructions defined by the plurality of modules.

According to an embodiment herein, the data extraction module is configured to extract and store the plurality of event-based data elements received from the plurality of sensors of the sensor device. According to an embodiment herein, the data tagging module is configured to aggregate and tag each of the plurality of event-based data elements based on a position of each of the plurality of shots at each of the plurality of regions on the bat where a ball is hit and feedback data received from a player who hit the ball with the bat.

According to an embodiment herein, the sweet spot detection module is configured to classify each of the plurality of shots into a first part, a second part, and a third part. The first part lies in a time duration before the ball hits the bat when the bat gains momentum till the ball is hit or missed. The second part is a time instance when the ball collides with the bat. The third part lies in a time duration when the bat loses momentum and attempts to return to rest. According to an embodiment herein, the sweet spot detection module is configured to process the plurality of regions on the bat in terms of a first region, a second region, a third region, and a fourth region. The first region is located proximal to a handle and a shoulder of the bat. The second region is located proximal to the first region and the shoulder of the bat. That is, the second region is a mid-top region on the bat. The third region is located proximal to the second region and a toe of the bat. That is, the third region is a mid-bottom region on the bat. The fourth region is located at the toe of the bat and proximal to the third region.

According to an embodiment herein, the sweet spot detection module is configured to determine responses produced by the bat at each of the plurality of regions during and after each of the plurality of shots is hit by analysing the plurality of event-based data elements. According to an embodiment herein, the sweet spot detection module is configured to detect and distinguish a sweet spot shot from a non-sweet spot shot and an edge shot among the plurality of shots based on the determined responses. According to an embodiment herein, the sweet spot detection module is configured to compute a resultant acceleration of the bat during and after each of the plurality of shots for each of the plurality of regions, compute a change in the resultant acceleration of the bat after each of the plurality of shots for each of the plurality of regions using a statistical metric, and analyse a deviation in the resultant acceleration versus a deviation in the change in the resultant acceleration of the bat associated with each of the plurality of shots for each of the plurality of regions. According to an embodiment herein, the statistical measure is standard deviation. According to an embodiment herein, the sweet spot detection module is configured to analyse the deviation in acceleration between two axes associated with each of the plurality of shots for each of the plurality of regions. According to an embodiment herein, the sweet spot detection module is configured to analyse the deviation in the resultant acceleration versus the deviation in the change in the resultant acceleration of the bat associated with each of the plurality of shots for each of the plurality of regions by generating one or more decision boundaries for clustering the plurality of shots and classifying each of the plurality of shots as a sweet spot shot, a non-sweet spot shot, and an edge shot.

According to an embodiment herein, the plurality of modules comprises a machine learning module configured to predict one or more of the plurality of regions on the bat and wherein the sweet spot shot is detected using a statistical metric, for example, standard deviation, in three axes.

According to an embodiment herein, a method for detecting a sweet spot on a bat is provided. According to an embodiment herein, the method disclosed herein comprises mounting a sensor device on a rear surface of the bat used by a player; recording and collecting impact data of the bat once the player starts playing shots using the sensors provided in the sensor device; filtering noise from the collected data; and transmitting the filtered data to a user device, for example, a mobile device. The method disclosed herein further comprises extracting the filtered data received from the sensor device; tagging the filtered data using a mobile application provided in the user device; and transmitting the tagged data to a remote server for analysing and modelling purposes and for storing the analysed data centrally.

FIG. 1 illustrates a system 100 for detecting a sweet spot on a bat 101, according to an embodiment herein. The system 100 disclosed herein is a portable system for determining whether a ball has hit the sweet spot on the bat 101. The system 100 disclosed herein comprises a sensor device 102 mounted on the rear surface 101a of the bat 101. The sensor device 102 comprises multiple sensors such as an accelerometer sensor, a magnetometer sensor, and a gyroscope sensor. According to an embodiment herein, the sensors are, for example, miniaturized inertial measurement unit (IMU) sensors positioned on the rear surface 101a of the bat 101 for measuring physical aspects of a swing of the bat 101 and recreating three-dimensional (3D) motion of each swing. According to an embodiment herein, the sensor device 102 is a 9 degrees of freedom (DOF) inertial measurement unit comprising a 3-axis accelerometer, a 3-axis gyroscope, and a 3-axis magnetometer configured on a one-piece printed circuit board (PCB). According to an embodiment herein, the sensor device 102 further comprises a storage device, for example, a temporary storage device such as a flash memory, a microcontroller, and a transceiver. The sensor device 102 is configured to continuously record event-based data elements and filter the live stream data produced by the sensors. The sensor device 102 records a snapshot around an impact of a ball on the bat 101. In an embodiment, the sensor device 102 records interrupts from the accelerometer sensor along with a rate with which the acceleration is changing. The sensors collect data around a reference point, that is, a point in time when the ball hits the bat 101, herein referred to as a "ball impact point". The sensors store the collected data in a circular buffer of the temporary storage device, which is filled with the latest data at one end and is cleared on the other end.

The sensor device 102 then transmits the collected data to a user device 103 via a network 104 using the transceiver. The user device 103 is an electronic device, for example, one or more of a personal computer, a tablet computing device, a mobile computer, a mobile phone, a smart phone, a portable computing device, a laptop, a personal digital assistant, a wearable computing device such as smart glasses, a smart watch, etc., a touch centric device, a client device, a portable electronic device, a network enabled computing device, an interactive network enabled communication device, a gaining device, an image capture device, any other suitable computing equipment, combinations of multiple pieces of computing equipment, etc. The network 104 is, for example, one of the internet, an intranet, a wired network, a wireless network, a communication network that implements Bluetooth® of Bluetooth Sig, Inc., a network that implements Wi-Fi® of Wi-Fi Alliance Corporation, an ultra-wideband (UWB) communication network, a wireless universal serial bus (USB) communication network, a communication network that implements ZigBee® of ZigBee Alliance Corporation, a general packet radio service (GPRS) network, a mobile telecommunication network such as a global system for mobile (GSM) communications network, a code division multiple access (CDMA) network, a third generation (3G) mobile communication network, a fourth generation (4G) mobile communication network, a fifth generation (5G) mobile communication network, a long-term evolution (LTE) mobile communication network, a public telephone network, etc., a local area network, a wide area network, an internet connection network, an infrared communication network, etc., or a network formed from any combination of these networks. A player undergoing coaching or training for a sport such as cricket provides and receives feedback through the user device 103. According to an embodiment herein, the sensor device 102 communicates with the user device 103, for example, via a Bluetooth low energy (BLE) network technology. According to an embodiment herein, the system 100 disclosed herein is used on a sports field for training and coaching players in a near instantaneous time period.

According to an embodiment herein, the user device 103 is a mobile device comprising a mobile application that receives the data transmitted by the sensor device 102 using the transceiver. According to an embodiment herein, the user device 103 comprises a data extraction module for extracting the received data and a data tagging module for tagging the extracted data for analysing shots hit by the player using the bat 101 as disclosed in the detailed description of FIG. 2.

According to an embodiment herein, the system 100 further comprises a server, for example, a remote cloud-based server, herein referred to as a sweet spot detection server 105 configured to receive the tagged data from the user device 103 via a transceiver of the user device 103. The sweet spot detection server 105 is a computing device, for example, one or more of a personal computer, a workstation, a network enabled computing device, an interactive network enabled communication device, any other suitable computing equipment, combinations of multiple pieces of computing equipment, etc. The sweet spot detection server 105 comprises a sweet spot detection module configured as an analysis module for analysing and modelling the tagged data as disclosed in the detailed description of FIG. 2. According to an embodiment herein, the sweet spot detection server 105 further comprises a machine learning module configured to execute one or more machine learning algorithms for predicting and classifying the shots. The sweet spot detection server 105 further comprises a database configured to centrally store the analysed data. The sweet spot detection server 105 further comprises a processor or a control unit configured to control the operation of the modules embedded in the sweet spot detection server 105.

Figure 2:
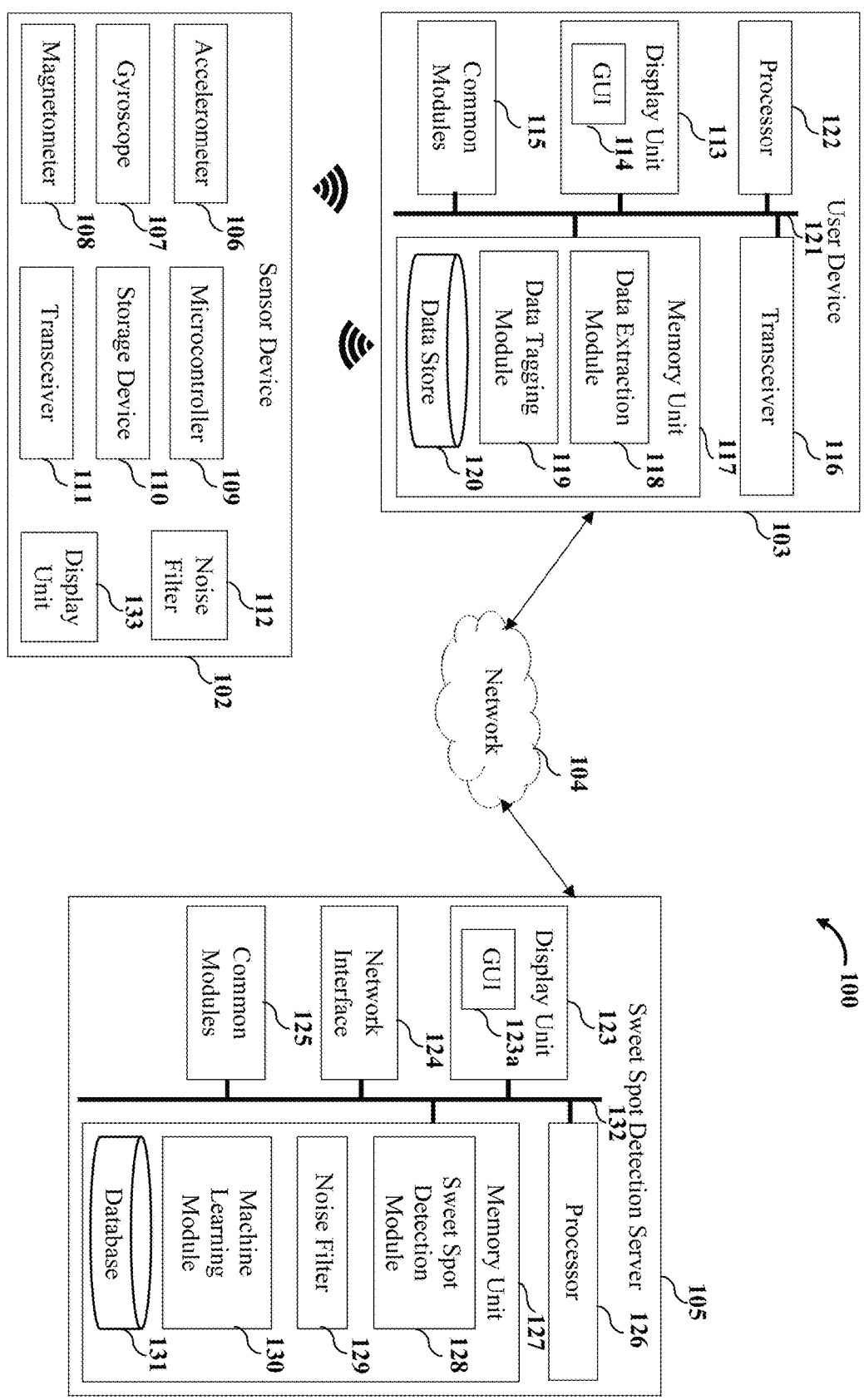
FIG. 2 illustrates an architectural block diagram of the system for detecting a sweet spot on a bat, according to an embodiment herein.

FIG. 2 illustrates an architectural block diagram of the system 100 for detecting a sweet spot on a bat, according to an embodiment herein. The system 100 disclosed herein comprises the sensor device 102 communicative coupled to a user device 103 and the sweet spot detection server 105 via the network 104. The sensor device 102 is operable coupled to the rear surface 101a of the bat 101 as illustrated in FIG. 1. The sensor device 102 comprises multiple sensors configured to continuously record event-based data elements associated with multiple shots on multiple regions on the bat 101 within a configurable time period in real time or near real time. The event-based data elements comprise, for example, acceleration and angular velocity of the bat 101 while the bat 101 is in motion and vibrations generated on the bat 101 after each of the shots. Each of the shots comprises an impact of the ball on the bat 101. According to an embodiment herein, each of the shots is represented in terms of acceleration in three dimensions, for example, X, Y, and Z dimensions, and angular velocity in three axes, for example, an X-axis, a Y axis, and a Z axis. The shots comprise, for example, sweet spot shots, non-sweet spot shots, and edge shots. The sweet spot shots refer to the shots hit on the sweet spot of the bat 101 where a vibration of the bat 101 is minimum and maximum energy is conveyed to a ball when the bat 101 hits the ball. The non-sweet spot shots refer to bad shots hit on non-sweet spots of the bat 101 that results in jarring in the hands and forearms of the player. The edge shots refer to the shots that hit or slightly touch the edges of the bat 101. According to an embodiment herein, the sensor device 102 comprises an accelerometer 106, a gyroscope 107, and a magnetometer 108. The accelerometer 106 measures an amount of force exerted on the ball by the bat 101 during a swing of the bat 101. When the accelerometer 106 experiences a change in motion, for example, the swing of the bat 101, the accelerometer 106 senses this change and measures the amount of acceleration in each of the three dimensions, that is, the X, Y, and Z dimensions. The gyroscope 107 measures a rate of rotation of the bat 101. The magnetometer 108 measures a direction, strength, and relative change of a magnetic field at each of the regions on the bat 101. When the bat 101 is swung, the accelerometer 106 senses the amount of force exerted on the accelerometer 106 by the bat 101, while the gyroscope 107 measures the rate with which the sensor device 102 rotates. According to an embodiment herein, the measurement range of the sensor device 102 includes acceleration, for example, up to +−16 g and angular rates, for example, up to 2000 degrees per second (dps) with an overall measurement capability of 800-6660 Hz.

The sensor device 102 further comprises a noise filter 112, a microcontroller 109, a storage device 110, and a transceiver 111, and a display unit 133. The noise filter 112 filters out noise from the event-based data elements measured by the accelerometer 106, the gyroscope 107, and the magnetometer 108. The noise filter 112 is, for example, a high pass filter with a cut-off frequency of 100 Hertz (Hz). According to an embodiment herein, the microcontroller 109 is operably and communicatively coupled to the storage device 110. The microcontroller 109 is configured to control the operations of the sensors, that is, the accelerometer 106, the gyroscope 107, and the magnetometer 108. The microcontroller 109 receives the event-based data elements associated with the shots on the different regions on the bat 101 and stores the event-based data elements in the storage device 110. According to an embodiment herein, the storage device 110 is a non-transitory, computer-readable storage medium configured to store the event-based data elements. The microcontroller 109 also transmits the event-based data elements to the user device 103 using the transceiver 111 via the network 104 as disclosed in the detailed description of FIG. 1. According to an embodiment herein, the display unit 133 displays the event-based data elements for viewing by a user, for example, a player.

According to an embodiment herein, the user device 103 is a client system that communicates with the sweet spot detection server 105 via the network 104, for example, a short-range network or a long-range network. The user device 103 and the sweet spot detection server 105 are computer systems programmable using high-level computer programming languages. In another embodiment, the sweet spot detection server 105 is implemented in a cloud computing environment. As used herein, "cloud computing environment" refers to a processing environment comprising configurable computing physical and logical resources, for example, networks, servers, storage media, virtual machines, applications, services, etc., and data distributed over the network 104. The cloud computing environment provides an on-demand network access to a shared pool of the configurable computing physical and logical resources. In an embodiment, the sweet spot detection server 105 is a cloud computing-based platform implemented as a service for detecting a sweet spot on a bat 101.

As illustrated in FIG. 2, the user device 103 and the sweet spot detection server 105 comprises non-transitory, computer-readable storage media, for example, memory units 117 and 127 for storing computer program instructions defined by modules of the system 100. According to an embodiment herein, the memory unit 117 of the user device 103 stores computer program instructions defined by the data extraction module 118 and the data tagging module 119 in a data store 120. Similarly, according to an embodiment herein, the memory unit 127 of the sweet spot detection server 105 stores computer program instructions defined by the sweet spot detection module 128 and the machine learning module 130 in a database 131.

The user device 103 further comprises a processor 122 operably and communicatively coupled to the memory unit 117 for executing the computer program instructions defined by the modules, for example, 118, 119, etc., of the user device 103. The sweet spot detection server 105 further comprises a processor 126 operably and communicatively coupled to the memory unit 127 for executing the computer program instructions defined by the modules, for example, 128, 129, 130, etc., of the sweet spot detection server 105. The memory units 117 and 127 of the user device 103 and the sweet spot detection server 105 respectively, are used for storing program instructions, applications, and data. According to an embodiment herein, the memory units 117 and 127 of the user device 103 and the sweet spot detection server 105 respectively, comprise random-access memories (RAMS) or other types of dynamic storage devices that store information and instructions for execution by the respective processors 122 and 126. The memory units 117 and 127 of the user device 103 and the sweet spot detection server 105 respectively, also store temporary variables and other intermediate information used during execution of the instructions by the respective processors 122 and 126. According to an embodiment herein, the user device 103 and the sweet spot detection server 105 further comprise read only memories (ROMs) or other types of static storage devices that store static information and instructions for execution by the respective processors 122 and 126. According to an embodiment herein, the modules, for example, 118, 119, 120, etc., of the user device 103 are stored in the memory unit 117. According to an embodiment herein, the modules, for example, 128, 129, 130, 131, etc., of the sweet spot detection server 105 are stored in the memory unit 127.

The processor 122 of the user device 103 is configured to execute the computer program instructions defined by the modules, for example, 118, 119, etc., of the user device 103 for detecting a sweet spot on the bat 101. Similarly, the processor 126 of the sweet spot detection server 105 is configured to execute the computer program instructions defined by the modules, for example, 128, 129, 130, etc., of the sweet spot detection server 105 for detecting a sweet spot on the bat 101. The processors 122 and 126 of the user device 103 and the sweet spot detection server 105 respectively, refer to any one or more microprocessors, central processing unit (CPU) devices, finite state machines, computers, microcontrollers, digital signal processors, logic, logic devices, application specific integrated circuits (ASICs), field-programmable gate arrays (FPGAs), chips, etc., or any combination thereof, capable of executing computer programs or a series of commands, instructions, or state transitions. According to an embodiment herein, the processors 122 and 126 of the user device 103 and the sweet spot detection server 105 respectively, are implemented as processor sets comprising, for example, programmed microprocessors and math or graphics co-processors. The user device 103 and the sweet spot detection server 105 are not limited to employing the processors 122 and 126 respectively. According to an embodiment herein, the user device 103 and the sweet spot detection server 105 employ controllers or microcontrollers. The processor 122 executes the modules, for example, 118, 119, etc., of the user device 103. The processor 126 executes the modules, for example, 128, 129, 130, etc., of the sweet spot detection server 105.

As illustrated in FIG. 2, the user device 103 further comprises a data bus 121, a display unit 113, and common modules 115. The data bus 121 permits communications between the modules, for example, 122, 113, 115, 116, 117, etc., of the user device 103. The display unit 113, via a graphical user interface (GUI) 114, displays information, display interfaces, user interface elements such as checkboxes, input text fields, etc., for example, for allowing a player to input feedback related to a presence or absence of a recoil force after hitting a shot using the bat 101. The user device 103 renders the GUI 114 on the display unit 113 for receiving inputs from the player. Similarly, the sweet spot detection server 105 further comprises a data bus 132, a display unit 123, and common modules 125. The data bus 132 permits communications between the modules, for example, 123, 124, 125, 126, 127, etc., of the sweet spot detection server 105. The display unit 123, via a GUI 123*a*, displays information, display interfaces, user interface elements such as checkboxes, input text fields, etc., for example, for displaying results of the analysis and modelling of the event-based data elements received from the sensor device 102. The sweet spot detection server 105 renders the GUI 123*a* on the display unit 123 for receiving inputs from the player. The GUIs 114 and 123*a* comprise, for example, online web interfaces, web-based downloadable application interfaces, mobile-based downloadable application interfaces, etc. The display units 113 and 123 of the user device 103 and the sweet spot detection server 105 respectively, display their respective GUIs 114 and 123*a*.

According to an embodiment herein, the user device 103 further comprises a transceiver 116 for enabling a connection of the user device 103 to the sensor device 102 and the sweet spot detection server 105. According to an embodiment herein, the transceiver 116 of the user device 103 communicates with the transceiver 111 of the sensor device 102 for receiving the event-based data elements from the sensor device 102. According to an embodiment herein, the transceiver 116 of the user device 103 enables connection of the user device 103 to the network 104 and receives the event-based data elements from the sensor device 102 via the network 104.

According to an embodiment herein, the sweet spot detection server 105 further comprises a network interface 124 for enabling a connection of the sweet spot detection server 105 to the network 104. In an embodiment, the network interface 124 is provided as an interface card also referred to as a line card. The network interface 124 is, for example, one or more of infrared interfaces, interfaces implementing Wi-Fi® of Wi-Fi Alliance Corporation, universal serial bus interfaces, FireWire® interfaces of Apple Inc., Ethernet interfaces, frame relay interfaces, cable interfaces, digital subscriber line interfaces, token ring interfaces, peripheral controller interconnect interfaces, local area network interfaces, wide area network interfaces, interfaces using serial protocols, interfaces using parallel protocols, Ethernet communication interfaces, asynchronous transfer mode interfaces, high speed serial interfaces, fiber distributed data interfaces, interfaces based on transmission control protocol (TCP)/internet protocol (IP), interfaces based on wireless communications technology such as satellite technology, radio frequency technology, near field communication, etc. The common modules 115 and 125 of the user device 103 and the sweet spot detection server 105 respectively, comprise, for example, input/output (I/O) controllers, input devices, output devices, fixed media drives such as hard drives, removable media drives for receiving removable media, etc. Computer applications and programs are used for operating the user device 103 and the sweet spot detection server 105. The programs are loaded onto fixed media drives and into the memory units 117 and 127 of the user device 103 and the sweet spot detection server 105 respectively, via the removable media drives. In an embodiment, the computer applications and programs are loaded into the memory units 117 and 127 of the user device 103 and the sweet spot detection server 105 respectively, directly via the network 104.

In an exemplary implementation illustrated in FIG. 2, the data extraction module 118 and the data tagging module 119 are embedded in the user device 103, stored in the memory unit 117, and executed by the processor 122 in the user device 103. The data extraction module 118 extracts the event-based data elements received from the sensors, for example, the accelerometer 106, the gyroscope 107, and the magnetometer 108 of the sensor device 102. The data extraction module 118 stores the extracted event-based data elements in the data store 120. The data store 120 is any storage area or medium that can be used for storing data and files. According to an embodiment herein, the data store 120 is any of a structured query language (SQL) data store or a not only SQL (NoSQL) data store. According to another embodiment herein, the data store 120 is a location on a file system. According to another embodiment herein, the data store 120 is configured to be remotely accessible by the user device 103 via the network 104. In another embodiment, the data store 120 is configured as a cloud-based database implemented in a cloud computing environment.

The data tagging module 119 aggregates and tags each of the event-based data elements based on a position of each shot at each region on the bat 101 where a ball is hit and feedback data received from the player who hit the ball with the bat 101. According to an embodiment herein, the feedback data comprises feedback regarding types of shots. According to an embodiment herein, the data tagging module 119 transmits the aggregated and tagged event-based data elements to the sweet spot detection server 105 via the network 104 using the transceiver 116.

In an exemplary implementation illustrated in FIG. 2, the sweet spot detection module 128 is configured as an analysis module embedded in the sweet spot detection server 105, stored in the memory unit 127, and executed by the processor 126 in the sweet spot detection server 105. According to an embodiment herein, the sweet spot detection module 128 receives the aggregated and tagged event-based data elements from the user device 103 via the network 104 using the network interface 124. According to an embodiment herein, the sweet spot detection module 128 processes multiple regions on the bat 101 in terms of a first region, a second region, a third region, and a fourth region as disclosed in the detailed description of FIG. 4. According to an embodiment herein, the sweet spot detection module 128 classifies each of the shots into a first part, a second part, and a third part. The first part lies in a time duration before the ball hits the bat 101 when the bat 101 gains momentum till the ball is hit or missed. The second part is a time instance when the ball collides with the bat 101. The third part lies in a time duration when the bat 101 loses momentum and attempts to return to rest.

According to an embodiment herein, the sweet spot detection module 128 determines responses produced by the bat 101 at each of the regions during and after each of the shots is hit by analysing the event-based data elements. According to an embodiment herein, the sweet spot detection module 128 detects and distinguishes a sweet spot shot from a non-sweet spot shot and an edge shot among the shots based on the determined responses.

According to an embodiment herein, the sweet spot detection module 128 computes a resultant acceleration of the bat 101 during and after each of the shots for each of the regions, computes a change in the resultant acceleration of the bat 101 after each of the shots for each of the regions using a statistical metric, and analyses a deviation in the resultant acceleration versus a deviation in the change in the resultant acceleration of the bat 101 associated with each of the shots for each of the regions. According to an embodiment herein, the statistical measure is standard deviation. According to an embodiment herein, the sweet spot detection module 128 analyses the deviation in the resultant acceleration versus the deviation in the change in the resultant acceleration of the bat 101 associated with each of the shots for each of the regions by generating one or more decision boundaries for clustering the shots and classifying each of the shots as a sweet spot shot, a non-sweet spot shot, and an edge shot. According to an embodiment herein, the sweet spot detection server 105 further comprises a noise filter 129 for filtering out noise from the aggregated and tagged event-based data elements prior to and/or during the analysis of the aggregated and tagged event-based data elements. According to an embodiment herein, the machine learning module 130 predicts one or more of the regions of the bat 101 where the sweet spot shot is detected based on a statistical metric, for example, standard deviation, in three axes.

The database 131 is any storage area or medium that can be used for storing data and files. According to an embodiment herein, the database 131 is any of a structured query language (SQL) data store or a not only SQL (NoSQL) data store. According to another embodiment herein, the database 131 is a location on a file system. According to another embodiment herein, the database 131 is configured to be remotely accessible by the sweet spot detection server 105 via the network 104. In another embodiment, the sweet spot detection server 105 is configured as a cloud-based database implemented in a cloud computing environment.

According to an embodiment herein, the data extraction module 118 and the data tagging module 119 embedded in the user device 103 are disclosed above as software executed by the processor 122. Similarly, according to an embodiment herein, the sweet spot detection module 128, the noise filter 129, and the machine leaning module 130 embedded in the sweet spot detection server 105 are disclosed above as software executed by the processor 126. According to an embodiment herein, the modules, for example, 118, 119, etc., of the user device 103 and the modules, for example, 128, 129, 130, etc., of the sweet spot detection server 105 are implemented completely in hardware. According to another embodiment herein, the modules, for example, 118, 119, etc., of the user device 103 and the modules, for example, 128, 129, 130, etc., of the sweet spot detection server 105 are implemented by logic circuits to carry out their respective functions disclosed above. According to another embodiment herein, the system 100 is also implemented as a combination of hardware and software and one or more processors, for example, 122, 126, etc., that are used to implement the modules, for example, 118, 119, etc., of the user device 103 and the modules, for example, 128, 129, 130, etc., of the sweet spot detection server 105.

For purposes of illustration, the detailed description refers to the data extraction module 118 and the data tagging module 119 being implemented in the user device 103 using programmed and purposeful hardware, while the sweet spot detection module 128 and the machine learning module 130 being implemented in the sweet spot detection server 105 using programmed and purposeful hardware. According to one embodiment herein, the data extraction module 118, the data tagging module 119, the sweet spot detection module 128, and the machine learning module 130 are implemented in the sensor device 102 to carry out their respective functions disclosed above from within the sensor device 102. According to one embodiment, the display unit 133 of the sensor device 102 displays information, display interfaces, user interface elements such as checkboxes, input text fields, etc., for allowing a player to input feedback related to a presence or absence of a recoil force after hitting a shot using the bat 101, for displaying results of the analysis and modelling of the event-based data elements received from the sensor device 102, etc. According to one embodiment herein, the data extraction module 118, the data tagging module 119, the sweet spot detection module 128, and the machine learning module 130 are embedded in any one or more of the sensor device 102, the user device 103, and the sweet spot detection server 105.

For purposes of illustration, the detailed description refers to the modules, for example, 118, 119, etc., of the user device 103 and the modules 128, 129, 130, etc., of the sweet spot detection server 105 being nm locally on single computer systems; however the scope of the system 100 and the method disclosed herein is not limited to the modules, for example, 118, 119, etc., of the user device 103 and the modules 128, 129, 130, etc., of the sweet spot detection server 105 being run locally on single computer systems via their respective operating systems and processors 122 and 126, but may be extended to run remotely over the network 104 by employing a web browser and a remote server, a mobile phone, or other electronic devices. In an embodiment, one or more portions of the system 100 disclosed herein are distributed across one or more computer systems (not shown) coupled to the network 104.

The non-transitory, computer-readable storage media disclosed herein store computer program instructions executable by the processors 122 and 126 for detecting a sweet spot on a bat 101. The computer program instructions implement the processes of various embodiments disclosed above and perform additional steps that may be required and contemplated for detecting a sweet spot on a bat 101. When the computer program instructions are executed by the processors 122 and 126 of the user device 103 and the sweet spot detection server 105 respectively, the computer program instructions cause the respective processors 122 and 126 to perform the steps of the method for detecting a sweet spot on a bat 101 as disclosed in the detailed descriptions of FIG. 3. In an embodiment, a single piece of computer program code comprising computer program instructions performs one or more steps of the method disclosed in the detailed descriptions of FIG. 3. The processors 122 and 126 of the user device 103 and the sweet spot detection server 105 respectively, retrieves these computer program instructions and executes them.

A module, or an engine, or a unit, as used herein, refers to any combination of hardware, software, and/or firmware. As an example, a module, or an engine, or a unit includes hardware, such as a microcontroller, associated with a non-transitory, computer-readable storage medium to store computer program codes adapted to be executed by the microcontroller. Therefore, references to a module, or an engine, or a unit, in an embodiment, refer to the hardware that is specifically configured to recognize and/or execute the computer program codes to be held on a non-transitory, computer-readable storage medium. According to an embodiment herein, the computer program codes comprising computer readable and executable instructions are implemented in any programming language, for example, C, C++, C#, Java®, JavaScript®, Fortran, Ruby, Perl®, Python®, Visual Basic®, hypertext preprocessor (PHP), Microsoft® .NET, Objective-CO, etc. According to an embodiment herein, other object-oriented, functional, scripting, and/or logical programming languages are also used. According to an embodiment herein, the computer program codes or software programs are stored on or in one or more mediums as object code. According to an embodiment herein, the term "module" or "engine" or "unit" refers to the combination of the microcontroller and the non-transitory, computer-readable storage media. Often module or engine or unit boundaries that are illustrated as separate commonly vary and potentially overlap. For example, a module or an engine or a unit may share hardware, software, firmware, or a combination thereof, while potentially retaining some independent hardware, software, or firmware. In various embodiments, a module or an engine or a unit includes any suitable logic.

Figure 3:
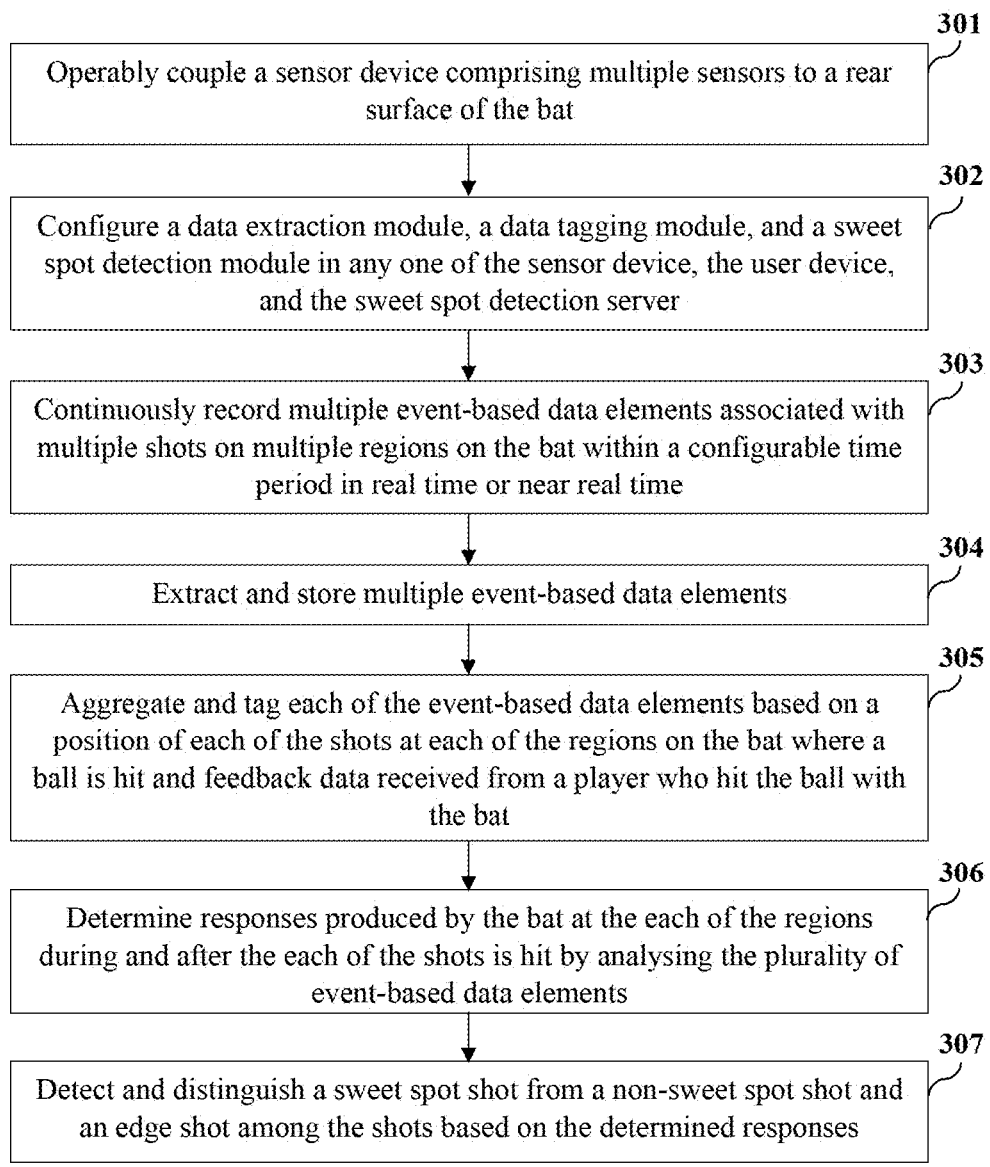
FIG. 3 illustrates a flowchart comprising a method for detecting a sweet spot region on a bat and distinguishing a sweet spot shot from a non-sweet spot shot, according to an embodiment herein.

FIG. 3 illustrates a flowchart comprising a method for detecting a sweet spot region on a bat and distinguishing a sweet spot shot from a non-sweet spot shot, according to an embodiment herein. In the method disclosed herein, a sensor device comprising multiple sensors, for example, an accelerometer, a gyroscope, a magnetometer, etc., are operably coupled 301 to a rear surface of the bat. Furthermore, a data extraction module, a data tagging module, and a sweet spot detection module are configured 302 in any one of the sensor device, the user device, and the sweet spot detection server as disclosed in the detailed description of FIG. 2. In the method disclosed herein, the sensors of the sensor device continuously record 303 multiple event-based data elements associated with multiple shots on multiple regions on the bat within a configurable time period in real time or near real time. The data extraction module extracts and stores 304 the event-based data elements. The data tagging module aggregates and tags 305 each of the event-based data elements based on a position of each of the shots at each of the regions on the bat where a ball is hit and feedback data received from a player who hit the ball with the bat. The sweet spot detection module determines 306 responses produced by the bat at each of the regions during and after each of the shots is hit by analysing the event-based data elements. The sweet spot detection module detects and distinguishes 307 a sweet spot shot from a non-sweet spot shot and an edge shot among the shots based on the determined responses.

Figure 4:
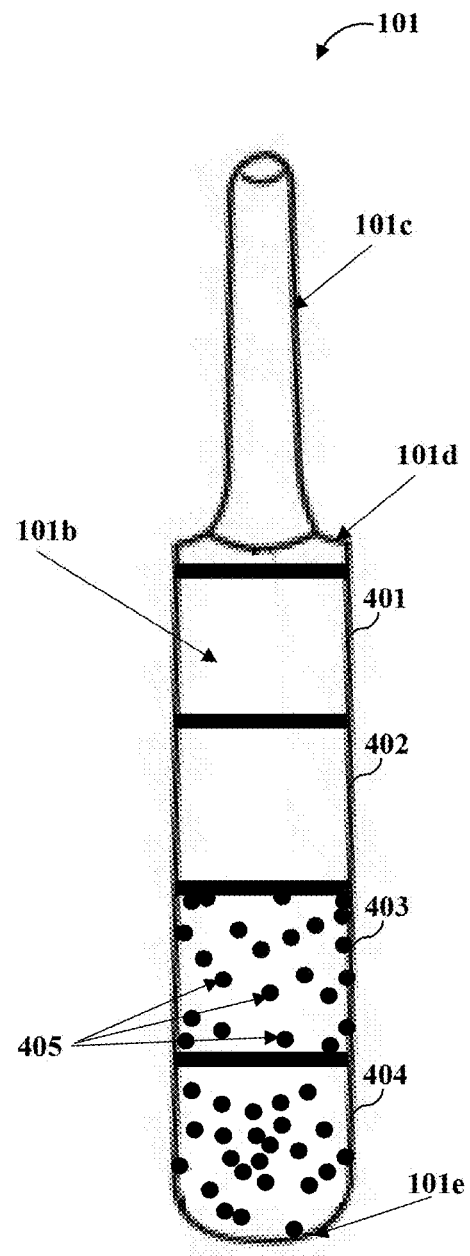
FIG. 4 illustrates an elevation view of a cricket bat classified into multiple regions, showing impact points in the lower regions of the cricket bat used for analysis and sweet spot detection.

FIG. 4 illustrates an elevation view of a cricket bat 101 classified into multiple regions 401, 402, 403, and 404, showing impact points 405 in the lower regions 403 and 404 of the cricket bat 101 used for analysis and sweet spot detection. The front surface 101b of the cricket bat 101 is illustrated in FIG. 4. The sensor device 102 is mounted on the rear surface 101a of the cricket bat 101 as illustrated in FIG. 1. According to an embodiment herein, the sweet spot detection module 128 illustrated in FIG. 2, processes multiple regions on the cricket bat 101 in terms of a first region 401, a second region 402, a third region 403, and a fourth region 404 as disclosed in the detailed description of FIG. 4. The first region 401 is located proximal to a handle 101c and a shoulder 101d of the cricket bat 101. The second region 402 is located proximal to the first region 401 and the shoulder 101d of the cricket bat 101. That is, the second region 402 is a mid-top region on the cricket bat 101. The third region 403 is located proximal to the second region 402 and a toe 101e of the cricket bat 101. That is, the third region 403 is a mid-bottom region on the cricket bat 101. The fourth region 404 is located at the toe 101e of the cricket bat 101 and proximal to the third region 403.

Sweet spot shots on the front surface 101b of the cricket bat 101 as indicated by the impact points 405 are closely related to aspects such as physical motion and vibrations occurring post the impact. The accelerometer 106 of the sensor device 102 illustrated in FIG. 2, capture these aspects of the shots. The accelerometer 106 records accelerometer patterns that distinguish a sweet spot shot from the non-sweet spot shot. According to an embodiment herein, the accelerometer 106 collects raw acceleration data at a frequency of, for example, about 1 kilohertz (KHz) or samples at a rate of 1 millisecond (ms). Since the part preceding and succeeding the shot comprises noise, the accelerometer 106 records 200 samples for every ball impact event. That is, every shot is represented, for example, by acceleration in a 16 g mode and an angular velocity of about 2000 degrees per second (dps) for a time period of 200 ms.

According to an embodiment herein, several experiments are conducted using the system disclosed herein. The first set of experiments are performed by keeping a cricket bat 101 stationary held by a person, for example, a player, while a mallet is moved towards a blade of the cricket bat 101. The mallet comprises a ball attached to a stick. In the second set of experiments, the cricket bat 101 is moved towards the mallet with some amount of force applied by the person. In the first set of experiments, the sensor device 102 mounted on the rear surface 101a of the cricket bat 101 collects data when the mallet is moved towards the cricket bat 101. The experiment is performed by dividing the cricket bat 101 into four regions 401, 402, 403, and 404 as illustrated in FIG. 4. Following a command, a player moves the cricket bat 101 from rest and returns the cricket bat 101 to an original state. The cricket bat 101 is held stationary with both hands by the player and is suspended in air and another person hits the cricket bat 101 at separate regions. In between two shots, the sensor device 102 mounted on the rear surface 101a of the cricket bat 101 records and transmits event-based data elements related to the shots wirelessly to the user device 103 illustrated in FIGS. 1-2, for example, using Bluetooth low energy (BLE) transceivers. The data extraction module 118 in the user device 103 illustrated in FIG. 2, extracts the event-based data elements related to the shots while the data tagging module 119 in the user device 103 illustrated in FIG. 2, tags the shots region-wise to allow analysis of raw acceleration profiles at several positions on the cricket bat 101.

According to an embodiment herein, each shot is classified into three parts. The first part lies in the duration before the ball collides with the cricket bat 101. In this duration, the cricket bat 101 gains momentum till the time the cricket bat 101 hits or misses the ball. The second part is a time instance when the ball collides with the cricket bat 101. This collision and its impact lasts for around 20 ms irrespective of where the ball hit the cricket bat 101. During this time, the ball squashes the face or the front surface 101b of the cricket bat 101 and the cricket bat 101 vibrates at a substantially fast pace which is difficult to perceive with human eyes. After the collision occurs, the ball departs the cricket bat 101 and the cricket bat 101 undergoes a follow through movement. The third part takes place where the cricket bat 101 loses momentum and attempts to return to rest.

Figure 5A:
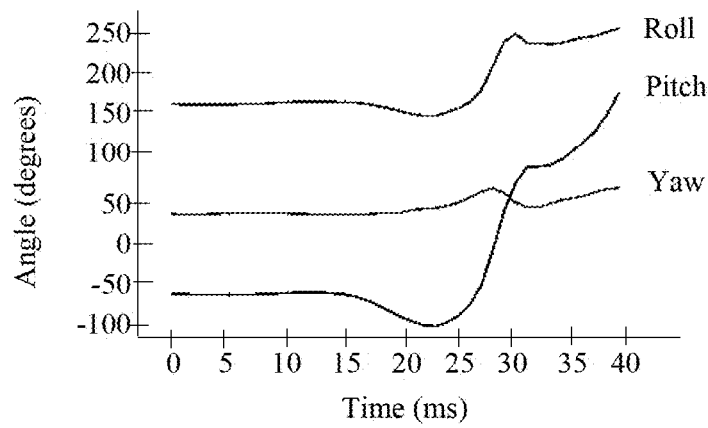
FIG. 5A illustrates a graph depicting a time versus angle plot showing roll, pitch and yaw values with respect to a shot hit on a bat, according to an embodiment herein.
Figure 5B:
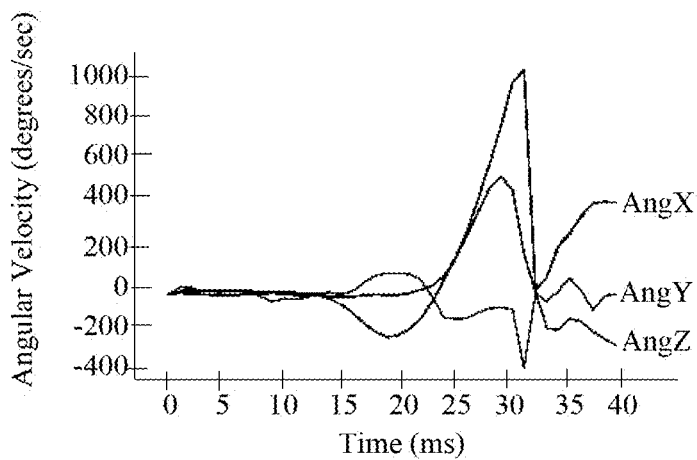
FIG. 5B illustrates a graph depicting a time versus angular velocity plot of the shot hit on the bat, according to an embodiment herein.
Figure 5C:
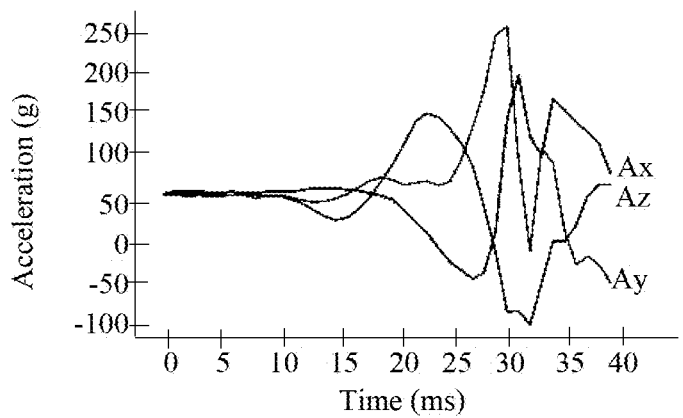
FIG. 5C illustrates a graph depicting a time versus acceleration plot of the shot hit on the bat, according to an embodiment herein.

FIGS. 5A-5C illustrate graphs depicting distinct parts of a cricket shot, according to an embodiment herein. The total duration of the cricket shot is, for example, 200 milliseconds (ms). FIG. SA illustrates a graph depicting a time versus angle plot showing roll, pitch and yaw values with respect to a shot hit on a bat, according to an embodiment herein. FIG. 5B illustrates a graph depicting a time versus angular velocity plot of the shot hit on the bat, according to an embodiment herein. FIG. 5C illustrates a graph depicting a time versus acceleration plot of the shot hit on the bat, according to an embodiment herein. With respect to FIGS. 5A-5C, from left to right, the first area of the graphs depicts the duration before the impact has taken place. The sensor device 102 mounted on the rear surface 101a of the cricket bat 101 illustrated in FIG. 1, detects noise in the sensor data present due to multiple reasons associated with multiple layers involved in the system. Therefore, the noise filter 112 of the sensor device 102 illustrated in FIG. 2, filters out the noise from the sensor data. Furthermore, the bat 101 is divided into multiple regions, for example, four regions or groups 401, 402, 403, and 404 on the front surface 101b of the bat blade as illustrated in FIG. 4 and as disclosed in the detailed description of FIG. 4. First Region 401 is closest to the handle 101c of the bat 101 followed by Second Region 402, Third Region 403, and Fourth Region 404 as illustrated in FIG. 4, where Fourth Region 404 is located farthest from the handle 101c of the bat 101.

FIG. 6 illustrates a table depicting time series data for acceleration in three dimensions and angular velocity in three axes with respect to a sensor frame along with metadata, according to an embodiment herein. According to an embodiment herein, every shot has time series data for acceleration in three dimensions and angular velocity in X, Y, Z axes with respect to a sensor frame along with some metadata comprising, for example, time, packet count (PC), and shot number (SN) as illustrated in FIG. 6. Consider an example where the accelerometer data in the sensor frame is at a 16 g full scale mode; angular velocity in the three axes are raw gyroscope values at 2000 dps sampled at 1 Khz; and packet count is continuously increasing from 1 to 800 for the first shot, 801 to 1600 for the next shot by automatic increment. The shot number identifies a single unique ball impact event or shot.

According to an embodiment herein, the first experiment determines how different areas on the bat blade produce different acceleration and gyroscope responses. The data tagging module tags the shots based on the position of the impact. The experiment is performed in a controlled environment. One person holds the bat in a stationary position and another person holds a mallet in hand. The person holding the mallet moves the mallet towards the stationary bat to simulate a ball impact. After the impact, the position where the contact took place is determined with the help of chalk dust on the face of the mallet which leaves a mark on the front surface of the bat. The chalk dust on the front surface of the bat indicates the area of impact on the bat. This experiment allows a near accurate determination of the region where the impact happened. According to an example embodiment herein, acceleration is considered to capture the physical aspect of the ball and the bat collision. Acceleration patterns depict an instantaneous change in the acceleration experienced by a body. To visually determine how the acceleration wavers region-wise, the sensor data recorded by the sensor device 102 mounted on the rear surface 101a of the cricket bat 101 illustrated in FIG. 1, is plotted. The sweet spot detection module derives two features, for example, resultant acceleration and a change in resultant acceleration, from existing data of accelerations in the three axes. The resultant acceleration is a square root of the sum of accelerations in all the degrees of freedom. The change in resultant acceleration is the difference of consecutive resultant acceleration values.

Figure 7A:
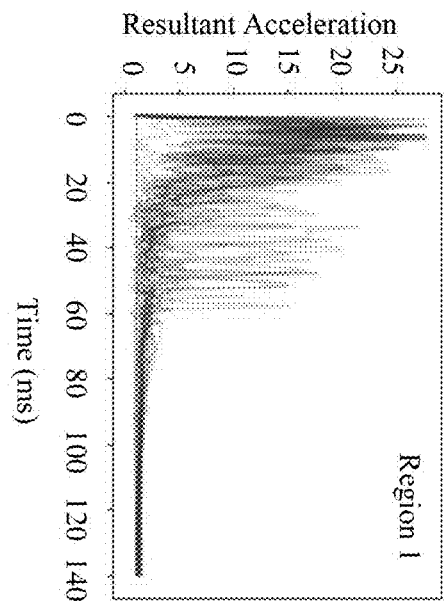
Figure 7B:
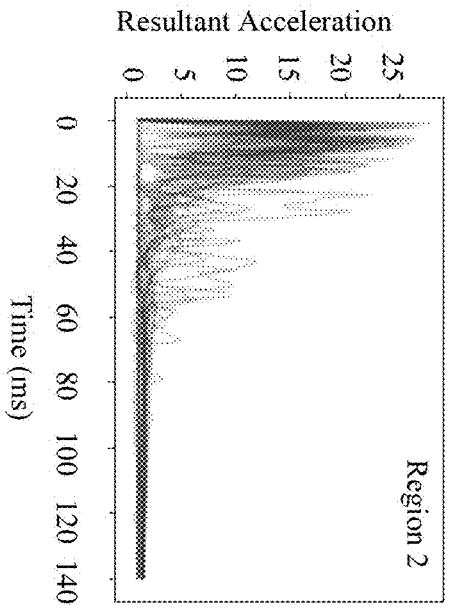
Figure 7C:
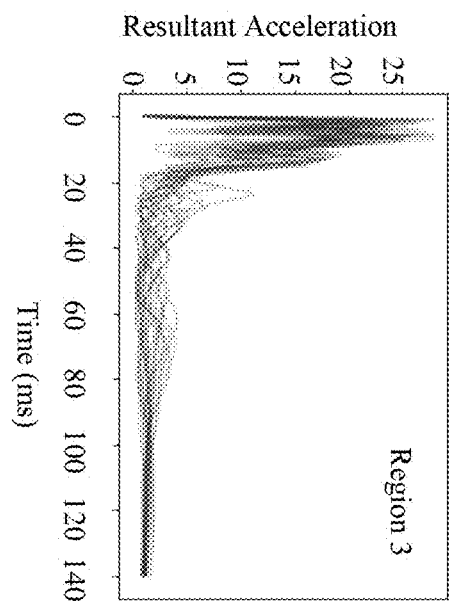
Figure 7C:
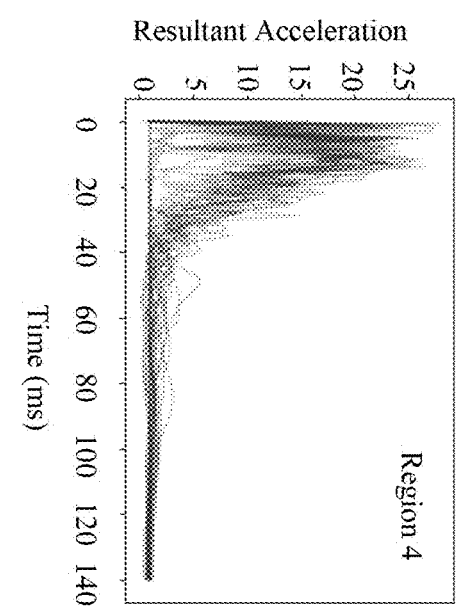

FIGS. 7A-7D illustrate graphs depicting resultant acceleration profiles versus time for shots hit on four regions 401, 402, 403, and 404 of a bat 101 shown in FIG. 4, according to an embodiment herein. FIG. 7A illustrates a graph depicting resultant acceleration profiles (in a time domain) versus time for a first region 401 of impact, according to an embodiment herein. FIG. 7B illustrates a graph depicting resultant acceleration profiles (in a time domain) versus time for a second region 402 of impact, according to an embodiment herein. FIG. 7C illustrates a graph depicting resultant acceleration profiles (in a time domain) versus time for a third region 403 of impact, according to an embodiment herein. FIG. 7D illustrates a graph depicting resultant acceleration profiles (in a time domain) versus time for a fourth region 404 of impact, according to an embodiment herein. In FIGS. 7A-7D, each plot shows resultant acceleration profiles (in a time domain) versus time for each shot. Resultant acceleration provides a complete representation of acceleration in all three axes, that is, the X-axis, the Y-axis, and the Z-axis. In the graphs illustrated in FIGS. 7A-7D, each line represents an acceleration profile for each shot. The graphs are plotted region-wise with time on the X-axis and resultant acceleration on the Y-axis as illustrated in FIGS. 7A-7D.

FIGS. 7A-7D show first region has more fluctuations in acceleration post the impact for a longer duration of time. That is, it takes a longer time for acceleration to settle down in first region, which in turn, means that there is jitteriness for a longer period of time. The initial 20 milliseconds (ms) of data after the impact has peaks in all the shots across the regions. Also, the graphs indicate that there exists a disturbance after the ball impact has taken place, which typically lasts for around 20 ms after 20 ms of time has passed after the impact. This disturbance or fluctuation is high in first Region and slightly decreases while moving downwards in the area of the bat. The disturbance or fluctuation is minimum in third region and again rises to a significant level in fourth region. The graphs illustrated in FIGS. 7A-7D also indicate an overlapping region across the bat which has a similar response.

According to an embodiment herein, a consideration is made towards some deviation that exists in the resultant acceleration in the period following the collision. To capture the variation after the impact or the shot is hit, the method disclosed herein implements several statistical measures that represent the change. According to an embodiment, standard deviation is the statistical metric used.

Figure 8A:
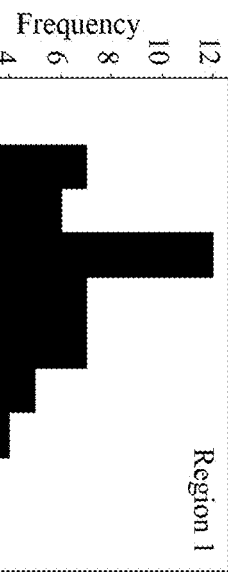
FIGS. 8A-8D illustrate histograms depicting a change in resultant acceleration values for shots hit on four regions of a bat, according to an embodiment herein.
Figure 8B:
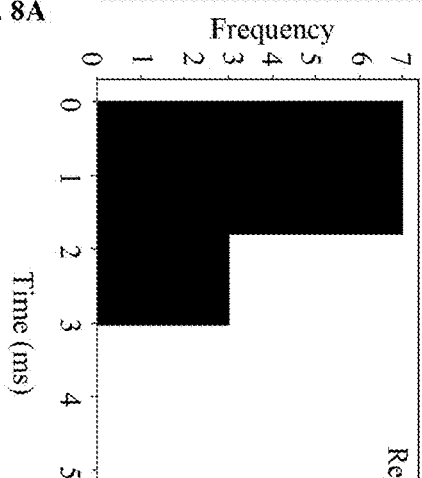
Figure 8D:
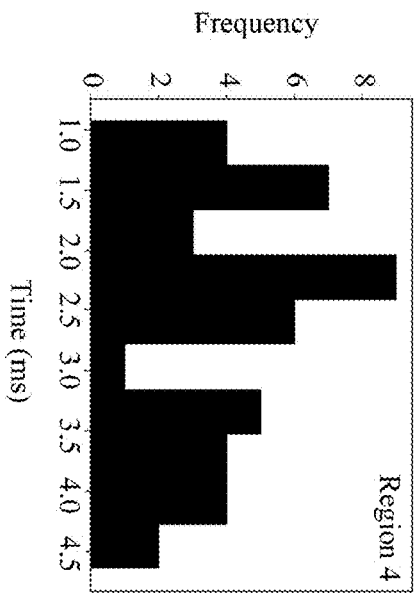
Figure 8C:
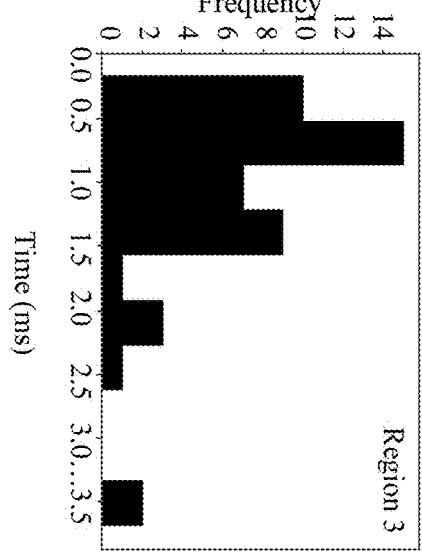

FIGS. 8A-8D illustrate histograms depicting a change in resultant acceleration values for shots hit on four regions 401, 402, 403, and 404 of a bat 101 shown in FIG. 4, according to an embodiment herein. The sweet spot detection module computes the standard deviation of resultant acceleration from a packet count of 1 to 200, which is 20 milliseconds post the impact point, region-wise and represents the results in the histograms illustrated in FIGS. 8A-8D. FIGS. 8A-8D indicate the distribution of standard deviation, 20 milliseconds post the impact for a duration of 20 milliseconds in resultant acceleration region-wise and histograms of change in resultant acceleration values for each shot region-wise. FIG. 8A illustrates a histogram depicting a change in resultant acceleration values for First region, 401, according to an embodiment herein. FIG. 8B illustrates a histogram depicting change in resultant acceleration values for Second region, 402, according to an embodiment herein. FIG. 8C illustrates a histogram depicting a change in resultant acceleration values for Third region, 403, according to an embodiment herein. FIG. 8D illustrates a histogram depicting a change in resultant acceleration values for Fourth region, 404, according to an embodiment herein.

Figure 9:
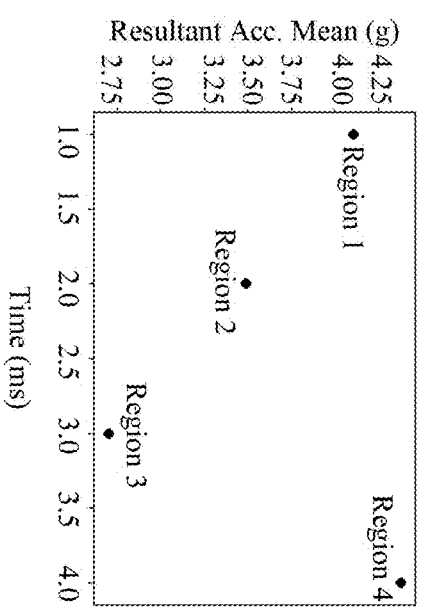
FIG. 9 illustrates a graph depicting a trend for a mean of a resultant acceleration for shots hit across four regions of the bat, indicating a variation in deviation across the four regions of the bat, according to an embodiment herein.

FIG. 9 illustrates a graph depicting a trend for a mean of a resultant acceleration for shots hit across four regions 401, 402, 403, and 404 of a bat 101 shown in FIG. 4, indicating a variation in deviation across the four regions 401, 402, 403, and 404 of the bat 101, according to an embodiment herein. FIG. 9 shows the variation is maximum in First region, 401, which decreases in Second region, 402, and reaches a minimum in Third region, 403, followed by an increase again in Fourth region, 404. In this example embodiment, the deviation is minimum for most of the shots belonging to Third region, 403 whereas the deviation is more for shots in First region, 401 and Fourth region, 404. The standard deviation follows a parabola where the standard deviation starts with around three or four in First region, 401 and then drops down to a minimum at Third region, 403 followed by rising up again. This, in turn, means that the disturbance after the impact dies quicker in a majority of shots in Third region, 403, which means that energy loss happened quickly when the ball hits the bat 101 at the sweet spot. However, there are some shots which have a similar minimum deviation in other regions as well. There is an entire gradient present on the bat blade which is continuous for an acceleration response instead of classified zones. Thus, a conclusion is drawn that the sweet spot is spread across the bat region and not limited to one region or one point on the bat surface.

After performing an initial exploratory analysis on the standard deviation in the resultant acceleration, standard deviation is considered for classifying the regions where the ball has hit the bat 101 and determining the sweet spot with a level of confidence. A change in resultant acceleration is also considered to indicate a continuous change in the relative levels of consecutive acceleration. According to an embodiment herein, the statistical metric used to measure a fluctuation in this change is standard deviation.

FIGS. 10A-10D illustrate histograms depicting a continuous change in relative levels of a consecutive acceleration for shots hit across four regions 401, 402, 403, and 404 of a bat 101 shown in FIG. 4, according to an embodiment herein. FIG. 10A illustrates a histogram depicting the continuous change in the relative levels of consecutive acceleration for First region, 401, according to an embodiment herein. FIG. 10B illustrates a histogram depicting the continuous change in the relative levels of consecutive acceleration for Second region, 402, according to an embodiment herein. FIG. 10C illustrates a histogram depicting the continuous change in the relative levels of consecutive acceleration for Third region, 403, according to an embodiment herein. FIG. 10D illustrates a histogram depicting the continuous change in the relative levels of consecutive acceleration for Fourth region, 404, according to an embodiment herein. In FIGS. 10A-10D, the histograms show that the behavior of the change in resultant acceleration is similar in nature to resultant acceleration.

FIG. 11 illustrates a graph depicting a trend of a deviation in a change of a resultant acceleration for shots hit on four regions 401, 402, 403, and 404 of the bat 101 shown in FIG. 4, according to an embodiment herein. The change in resultant acceleration is better when the intensity of the shots changes but the relative difference between the instantaneous values remains similar. As the change in resultant acceleration is a more robust measure, the sweet spot detection module combines and represents the resultant acceleration and the change in resultant acceleration together in one graph as illustrated in FIG. 11.

FIGS. 12A-12D illustrate graphs depicting a deviation in a change of a resultant acceleration versus a resultant acceleration deviation for shots hit on four regions 401, 402, 403, and 404 of the bat 101 shown in FIG. 4, according to an embodiment herein. FIG. 12A illustrates a graph depicting the deviation in the change of resultant acceleration versus the resultant acceleration deviation for First region, 401, according to an embodiment herein. FIG. 12B illustrates a graph depicting the deviation in the change of resultant acceleration versus the resultant acceleration deviation for Second region, 402, according to an embodiment herein. FIG. 12C illustrates a graph depicting the deviation in the change of resultant acceleration versus the resultant acceleration deviation for Third region, 403, according to an embodiment herein. FIG. 12D illustrates a graph depicting the deviation in the change of resultant acceleration versus the resultant acceleration deviation for Fourth region, 404, according to an embodiment herein. FIGS. 12A-12D show the deviation in the change of resultant acceleration versus the resultant acceleration deviation is contrasting in Third region, 403.

According to an embodiment herein, the machine learning module of the system executes machine learning algorithms to identify unique characteristics of a sweet spot shot. In one example embodiment, to model an insight of the sweet spot shot, the machine learning module trains a machine learning model using the standard deviation in the three axes as input and predicts the region on the bat where sweet spot shots are hit. Instead of writing rule-based logic for classifying the shots into sweet spot shots and non-sweet spot shots, the machine learning module trains statistical models to bucket the shots. The machine learning module allows learning from these statistical models and gaining insights to determine how a machine classifies waves into clusters.

According to an embodiment herein, the machine learning module implements supervised learning classifiers comprising, for example, a support vector machine (SVM) model, a decision tree model, and a random forest model. According to an embodiment, the machine learning module trains each model with 80% of the filtered data and the rest is used for testing the performance on unseen data with random shuffling in a split to remove a split bias. The target variable is the region to predict for a sweet spot shot and the features are standard deviation in acceleration in the X, Y, and Z axes for a 20-millisecond period post 20 milliseconds of the impact location.

According to one example embodiment, the machine learning module selects a confusion matrix as a performance metric to determine model among the SVM model, the decision tree model, and the random forest model is better.

The machine learning module uses the confusion matrix for describing the confidence on correct and misclassifications.

Figures 13A, 13B, 13C:
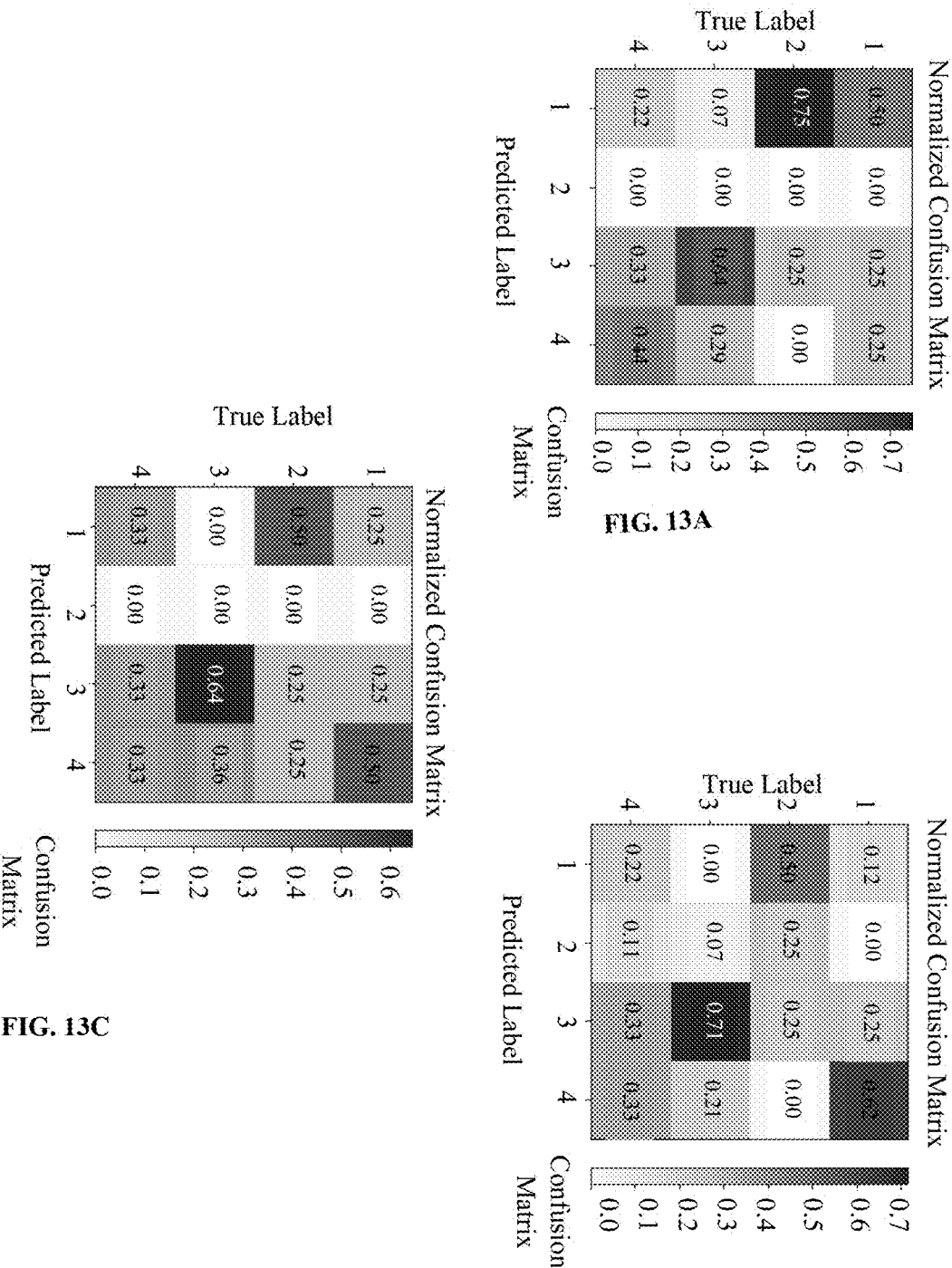
FIG. 13A illustrates a confusion matrix for a support vector machine algorithm executed by a machine learning module of the system for detecting a sweet spot on a bat, according to an embodiment herein.
FIG. 13B illustrates a confusion matrix for a decision tree algorithm executed by the machine learning module of the system for detecting a sweet spot on a bat, according to an embodiment herein.
FIG. 13C illustrates a confusion matrix for a random forests algorithm executed by the machine learning module of the system for detecting a sweet spot on a bat, according to an embodiment herein.

FIG. 13A illustrates a confusion matrix for the SVM algorithm executed by the machine learning module for detecting a sweet spot on the bat, according to an embodiment herein. FIG. 13B illustrates a confusion matrix for a decision tree algorithm executed by the machine learning module for detecting a sweet spot on the bat, according to an embodiment herein. FIG. 13C illustrates a confusion matrix for a random forests algorithm executed by the machine learning module for detecting a sweet spot on the bat, according to an embodiment herein. With reference to the normalized confusion matrixes illustrated in FIGS. 13A-13B, the confusion matrix for the decision tree model is found to be better when compared to the confusion matrix for the SVM model because of the smaller number of false positives and higher rate of true positive classification based on the regions.

According to an embodiment herein, the machine learning module analyses the output of the statistical models, for example, the SVM model, the decision tree model, and the random forests model. The machine learning module compares true labels with the predicted labels and identifies unique characteristics of each region. According to an embodiment herein, the machine learning module separates all the shots hit on each region of the bat into limits derived by the machine trained model. According to an embodiment herein, the sweet spot detection module of the system, in communication with the machine learning module, generates a decision boundary or a line for differentiating a majority of region in the scatter plots illustrated in FIGS. 12A-12D, as there are two dimensions in each of the scatter plots. An overlapping area below the decision boundary in all the regions is observed. The overlapping area below the decision boundary in Third region is more significant than the overlapping areas below the decision boundaries of the other regions.

Figure 14:
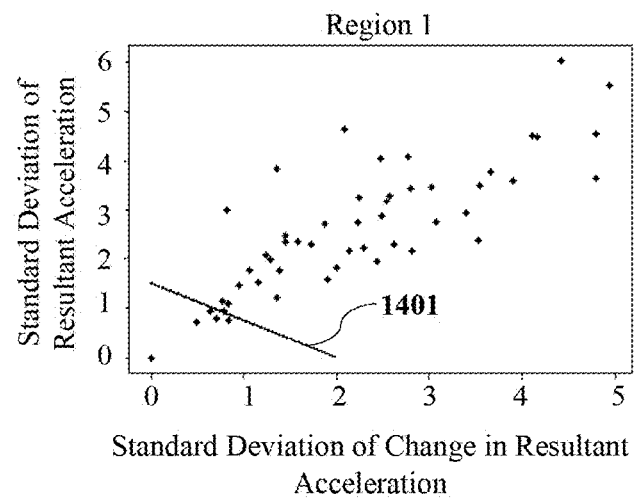
FIG. 14 illustrates a scatter plot depicting an output of the machine learning module for shots hit in a first region of a bat, according to an embodiment herein.
Figure 15A:
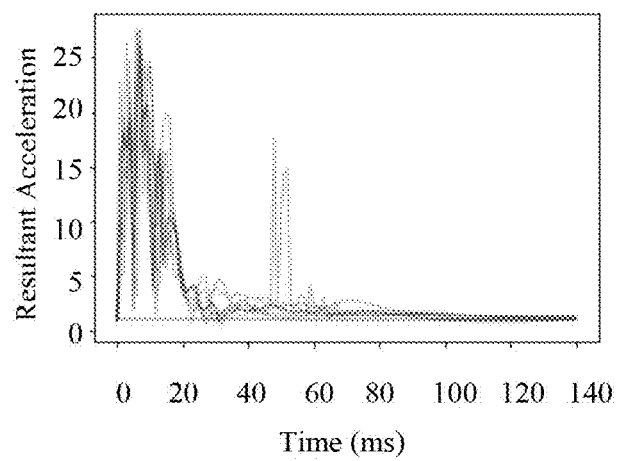
FIG. 15A illustrates a graph depicting shots that are below a decision boundary among the shots hit in the first region of the bat, according to an embodiment herein.
Figure 15B:
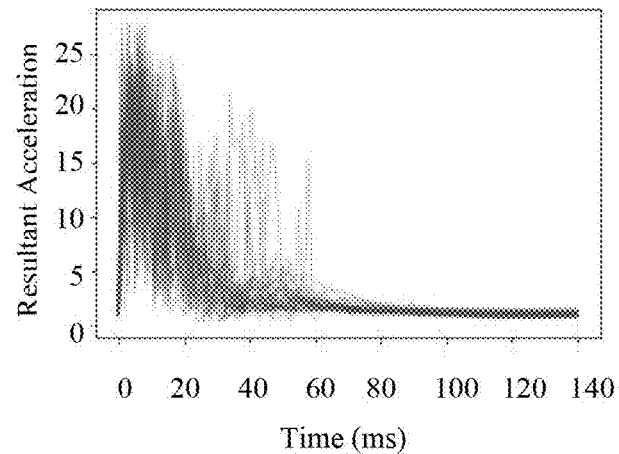
FIG. 15B illustrates a graph depicting shots that are above the decision boundary among the shots hit in the first region of the bat, according to an embodiment herein.

FIG. 14 illustrates a scatter plot depicting an output of the machine learning module for shots hit in a first region 401 of the bat 101 shown in FIG. 4, according to an embodiment herein. The decision boundary 1401 illustrated in FIG. 14, has 17% of the shots in the overlapping area. FIG. 15A illustrates a graph depicting shots that are below the decision boundary 1401 among the shots hit in the first region 401 of the bat 101, according to an embodiment herein. FIG. 15B illustrates a graph depicting shots that are above the decision boundary 1401 among the shots hit in the first region 401 of the bat 101, according to an embodiment herein.

Figure 16:
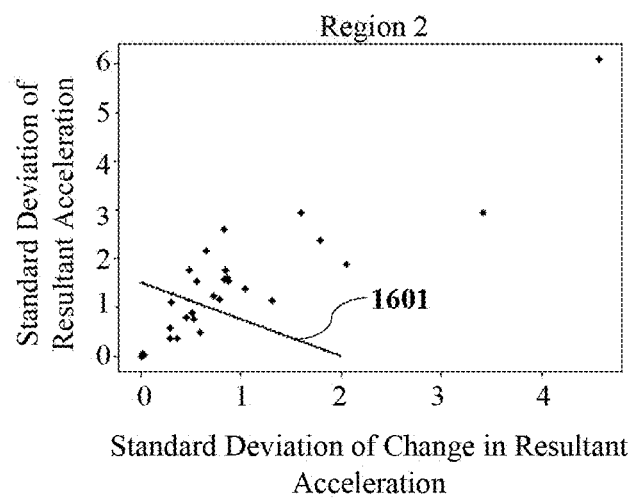
FIG. 16 illustrates a scatter plot depicting an output of the machine learning module for shots hit in a second region of a bat, according to an embodiment herein.
Figure 17A:
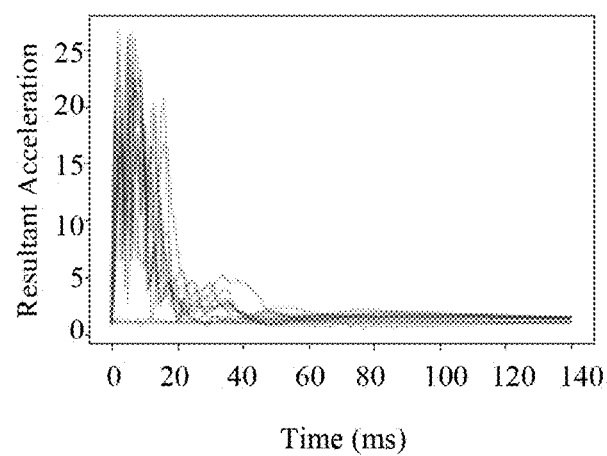
FIG. 17A illustrates a graph depicting shots that are below a decision boundary among the shots hit in the second region of the bat, according to an embodiment herein.
Figure 17B:
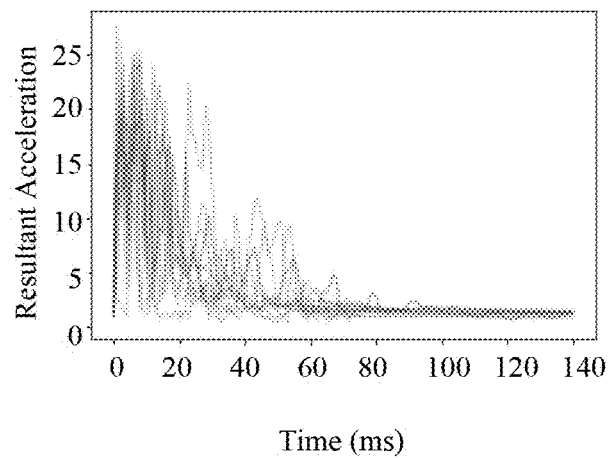
FIG. 17B illustrates a graph depicting shots that are above the decision boundary among the shots hit in the second region of the bat, according to an embodiment herein.

FIG. 16 illustrates a scatter plot depicting an output of the machine learning module for shots hit in a second region 402 of the bat 101 shown in FIG. 4, according to an embodiment herein. The decision boundary 1601 illustrated in FIG. 16, has 17% of the shots in the overlapping area. FIG. 17A illustrates a graph depicting shots that are below the decision boundary 1601 among the shots hit in the second region 402 of the bat 101, according to an embodiment herein. FIG. 17B illustrates a graph depicting shots that are above the decision boundary 1601 among the shots hit in the second region 402 of the bat 101, according to an embodiment herein.

Figure 18:
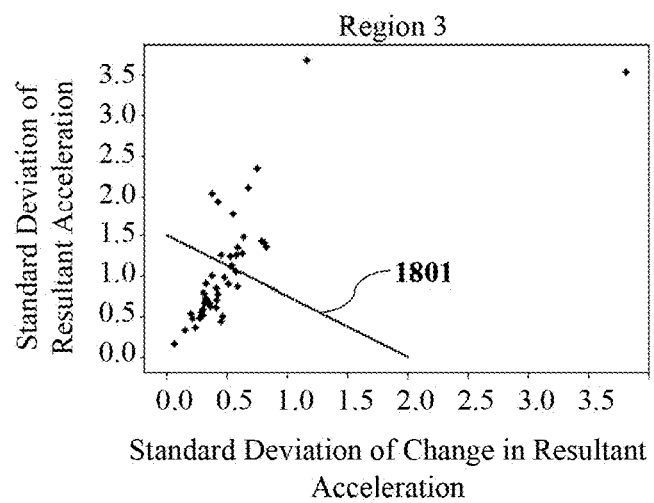
FIG. 18 illustrates a scatter plot depicting an output of the machine learning module for shots hit in a third region of a bat, according to an embodiment herein.
Figure 19A:
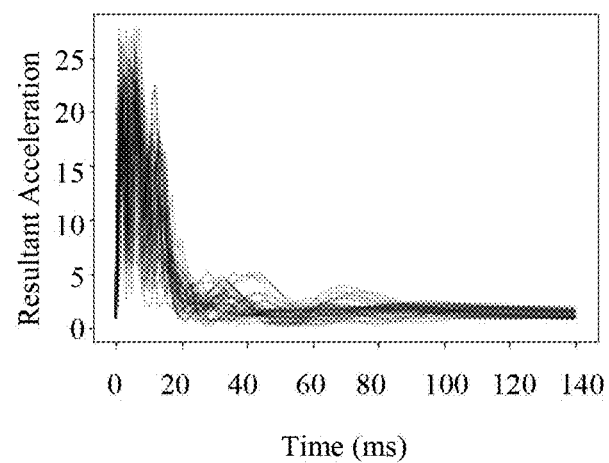
FIG. 19A illustrates a graph depicting shots that are below a decision boundary among the shots hit in the third region of the bat, according to an embodiment herein.
Figure 19B:
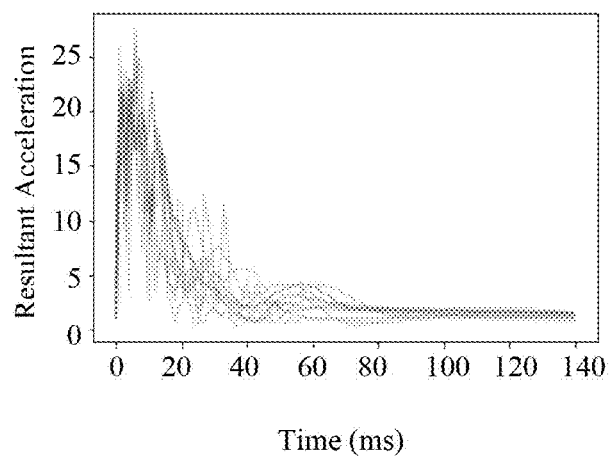
FIG. 19B illustrates a graph depicting shots that are above the decision boundary among the shots hit in the third region of the bat, according to an embodiment herein.

FIG. 18 illustrates a scatter plot depicting an output of the machine learning module for shots hit in a third region 403 of the bat 101 shown in FIG. 4, according to an embodiment herein. The scatter plot illustrated in FIG. 18, has 77% of the shots below the decision boundary 1801. FIG. 19A illustrates a graph depicting shots that are below the decision boundary 1801 among the shots hit in the third region 403 of the bat 101, according to an embodiment herein. FIG. 19B illustrates a graph depicting shots that are above the decision boundary 1801 among the shots hit in the third region 403 of the bat 101, according to an embodiment herein.

Figure 20:
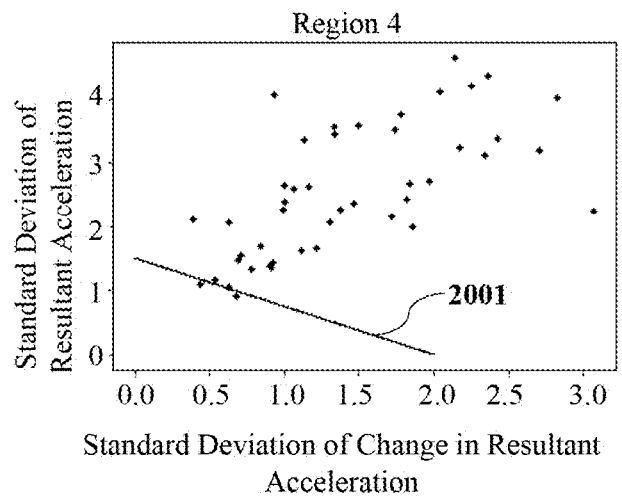
FIG. 20 illustrates a scatter plot depicting an output of the machine learning module for shots hit in a fourth region of a bat, according to an embodiment herein.
Figure 21A:
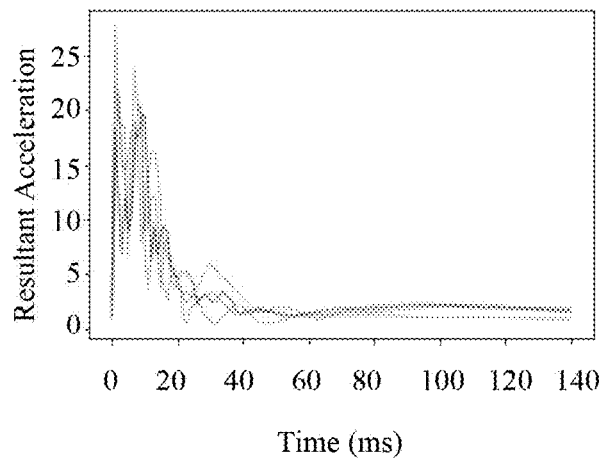
FIG. 21A illustrates a graph depicting shots that are below a decision boundary among the shots hit in the fourth region of the bat, according to an embodiment herein.
Figure 21B:
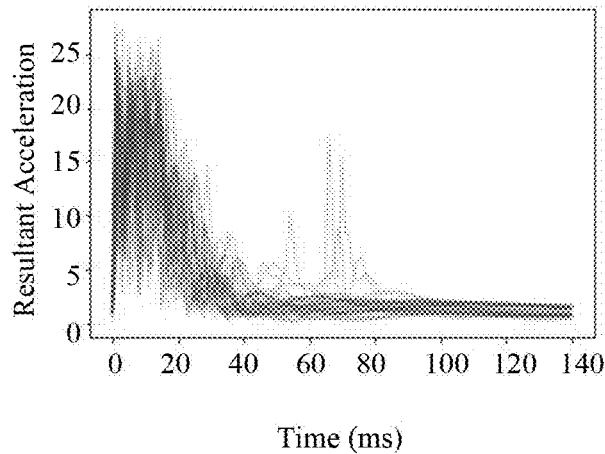
FIG. 21B illustrates a graph depicting shots that are above the decision boundary among the shots hit in the fourth region of the bat, according to an embodiment herein.

FIG. 20 illustrates a scatter plot depicting an output of the machine learning module for shots hit in a fourth region 404 of the bat 101 shown in FIG. 4, according to an embodiment herein. The scatter plot illustrated in FIG. 20, has 8% of the shots below the decision boundary 2001. FIG. 21A illustrates a graph depicting shots that are below the decision boundary 2001 among the shots hit in the fourth region 404 of the bat 101, according to an embodiment herein. FIG. 21B illustrates a graph depicting shots that are above the decision boundary 2001 among the shots hit in the fourth region 404 of the bat 101, according to an embodiment herein.

According to an embodiment herein, from the four scatter plots illustrated in FIG. 14, FIG. 16, FIG. 18, and FIG. 20, it is observed that Third region, 403 has a unique characteristic coaleased of a deviation in the resultant acceleration and a deviation in the rate of change of resultant acceleration. Therefore, with this decision boundary or line model in place, the sweet spot detection module of the system classifies every shot as a sweet spot shot or a non-sweet spot shot on a stationary bat 101 with an amount of confidence.

According to an embodiment herein, the second set of experiments identifies a sweet spot shot on a moving bat as in a real-world situation. According to an embodiment herein, the sweet spot detection module applies the same a-priori information to analyse two features, that is, the resultant acceleration and the change in resultant acceleration for shots in motion. In the second set of experiments, the bat 101 is classified into four regions 401, 402, 403, and 404 of the same size as illustrated in FIG. 4, and a mallet is used to hit the moving bat. The mallet is covered with white powder to record the point of impact on the bat. According to an embodiment herein, the data tagging module embedded in the user device tags the positions of the impacts with shot data using a mobile application deployed on the user device. The sweet spot detection module plots the standard deviation of resultant acceleration versus the standard deviation of change in resultant acceleration region-wise.

Figure 22A:
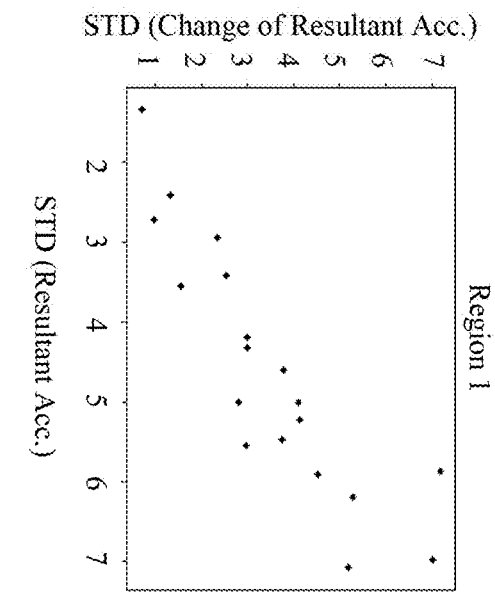
FIGS. 22A-22D illustrate graphs depicting a standard deviation of a resultant acceleration versus a standard deviation of a change in resultant acceleration for shots hit on the four regions of the bat, according to an embodiment herein.
Figure 22C:
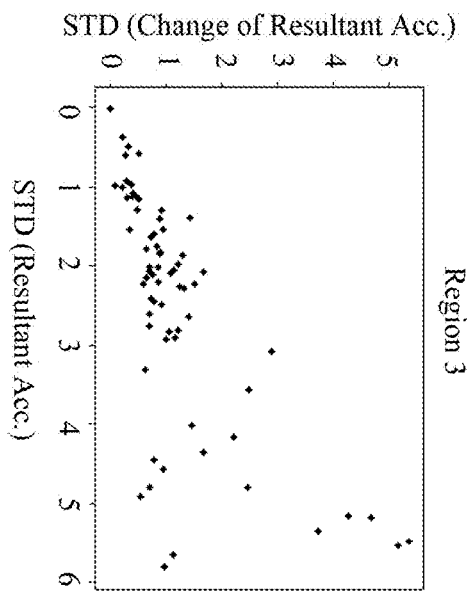
Figure 22B:
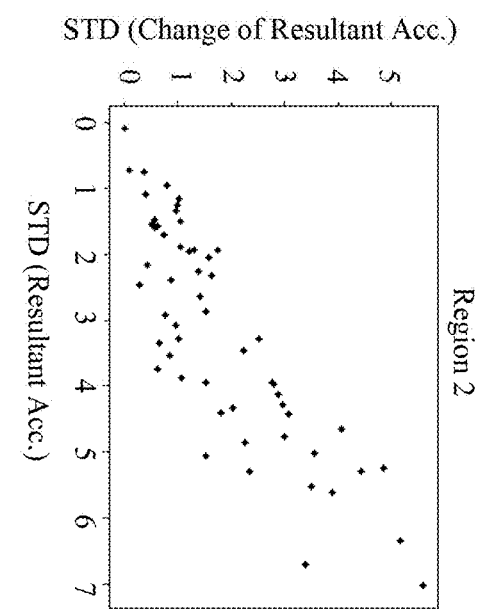
Figure 22D:
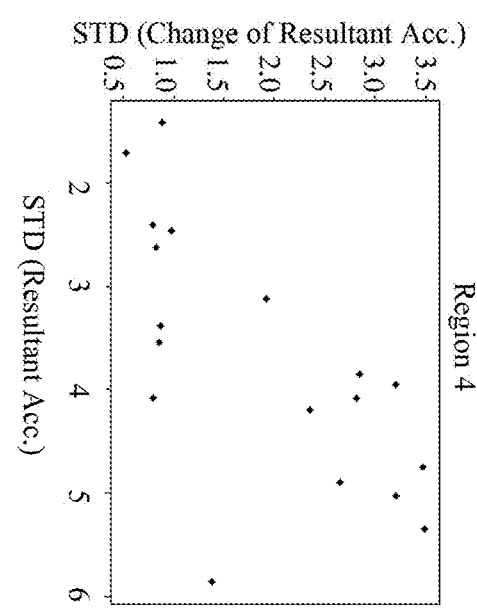

FIGS. 22A-22D illustrate graphs depicting a standard deviation of a resultant acceleration versus a standard deviation of a change in resultant acceleration for shots hit on the four regions 401, 402, 403, and 404 of the bat 101 shown in FIG. 4, according to an embodiment herein. FIG. 22A illustrates a graph depicting the standard deviation of the resultant acceleration versus the standard deviation of the change in resultant acceleration for First region, 401, that is, the top region of the bat 101, according to an embodiment herein. FIG. 22B illustrates a graph depicting the standard deviation of the resultant acceleration versus the standard deviation of the change in resultant acceleration for Second region, 402, that is, the mid-top region of the bat 101, according to an embodiment herein. FIG. 22C illustrates a graph depicting the standard deviation of the resultant acceleration versus the standard deviation of the change in resultant acceleration for Third region, 403, that is, the mid-bottom region of the bat 101, according to an embodiment herein. FIG. 22D illustrates a graph depicting the standard deviation of the resultant acceleration versus the standard deviation of the change in resultant acceleration for Fourth region 404, that is, the bottom of the bat 101, according to an embodiment herein.

From the four graphs illustrated in FIGS. 22A-22D, it is observed that Third region, 403 has a unique characteristic coaleased of deviation in the resultant acceleration and deviation in the rate of change of resultant acceleration.

According to an embodiment herein, the sweet spot detection module performs modeling for clustering the shots to determine and distinguish sweet spot shots from non-sweet spot shots. According to an embodiment herein, the sweet spot detection module clusters the shots into two parts in every region by generating a decision boundary or a line as a classifier. The sweet spot detection module performs region-wise plotting as illustrated in FIG. 23, FIG. 25, FIG. 27, and FIG. 29.

Figure 23:
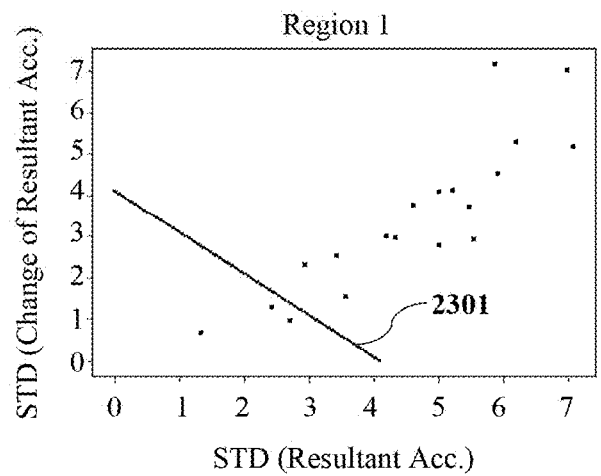
FIG. 23 illustrates a scatter plot depicting a use of a decision boundary for clustering of shots hit on the first region of the bat, according to an embodiment herein.
Figure 24A:
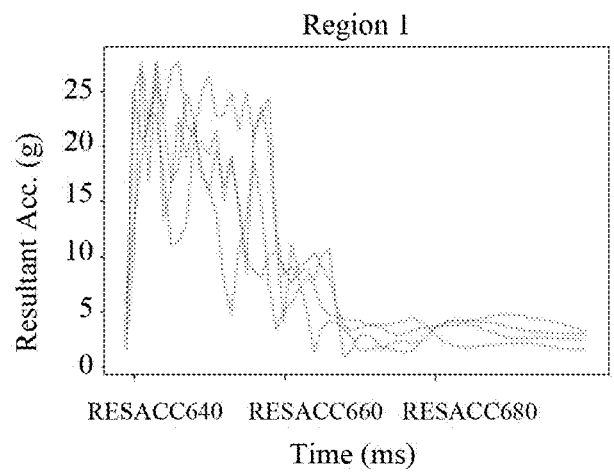
FIG. 24A illustrates a graph depicting shots that are below the decision boundary among the shots hit in the first region of the bat, according to an embodiment herein.
Figure 24B:
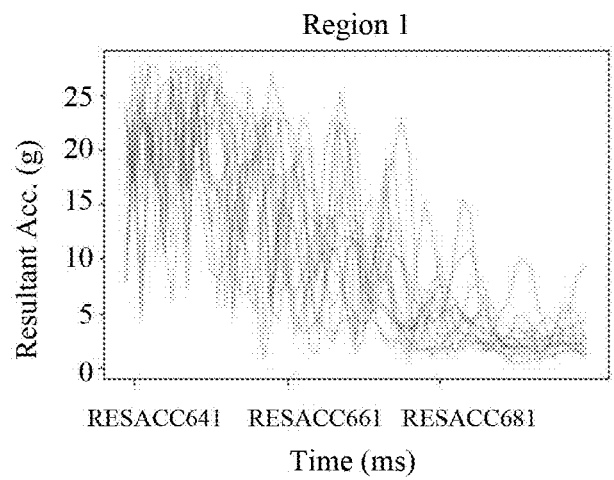
FIG. 24B illustrates a graph depicting shots that are above the decision boundary among the shots hit in the first region of the bat, according to an embodiment herein.

FIG. 23 illustrates a scatter plot depicting a use of a decision boundary 2301 for clustering of shots hit on the first region 401 of the bat 101 shown in FIG. 4, according to an embodiment herein. The sweet spot detection module uses the decision boundary 2301 to separate the shots into two clusters. The scatter plot illustrated in FIG. 23, has 15% of the shots below the decision boundary 2301. FIG. 24A illustrates a graph depicting shots that are below the decision boundary 2301 among the shots hit in the first region 401 of the bat 101, according to an embodiment herein. FIG. 24B illustrates a graph depicting shots that are above the decision boundary 2301 among the shots hit in the first region 401 of the bat 101, according to an embodiment herein.

Figure 25:
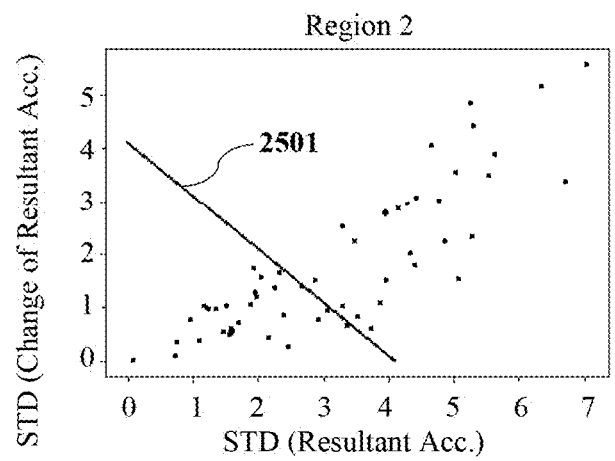
FIG. 25 illustrates a scatter plot depicting a use of a decision boundary for clustering of shots hit on the second region of the bat, according to an embodiment herein.
Figure 26A:
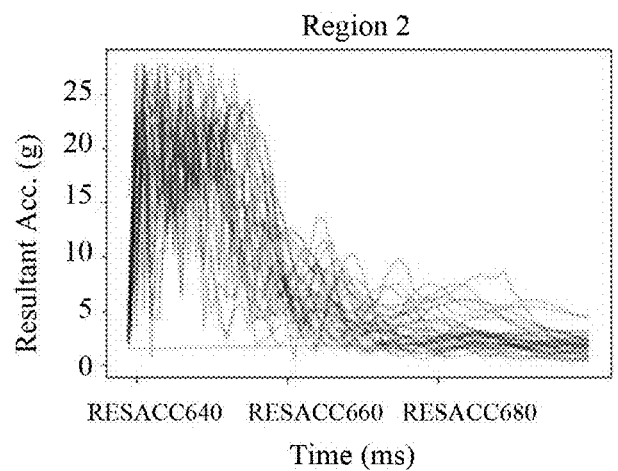
FIG. 26A illustrates a graph depicting shots that are below the decision boundary among the shots hit in the second region of the bat, according to an embodiment herein.
Figure 26B:
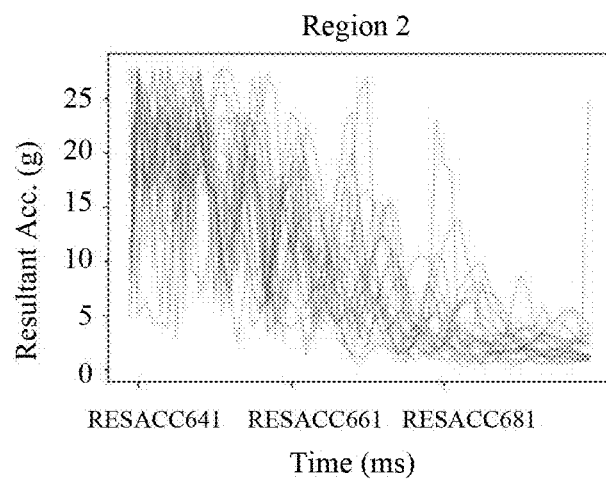
FIG. 26B illustrates a graph depicting shots that are above the decision boundary among the shots hit in the second region of the bat, according to an embodiment herein.

FIG. 25 illustrates a scatter plot depicting a use of a decision boundary 2501 for clustering of shots hit on the second region 402 of the bat 101 shown in FIG. 4, according to an embodiment herein. The sweet spot detection module uses the decision boundary 2501 to separate the shots into two clusters. The scatter plot illustrated in FIG. 25, has 50% of the shots below the decision boundary 2501. FIG. 26A illustrates a graph depicting shots that are below the decision boundary 2501 among the shots hit in the second region 402 of the bat 101, according to an embodiment herein. FIG. 26B illustrates a graph depicting shots that are above the decision boundary 2501 among the shots hit in the second region 402 of the bat 101, according to an embodiment herein.

Figure 27:
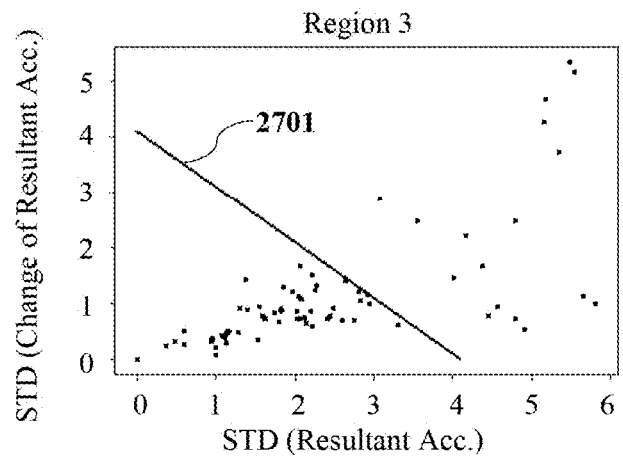
FIG. 27 illustrates a scatter plot depicting a use of a decision boundary for clustering of shots hit on the third region of the bat, according to an embodiment herein.
Figure 28A:
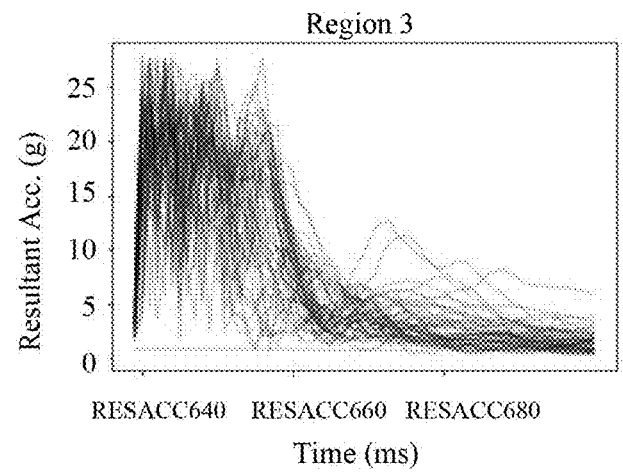
FIG. 28A illustrates a graph depicting shots that are below the decision boundary among the shots hit in the third region of the bat, according to an embodiment herein.
Figure 28B:
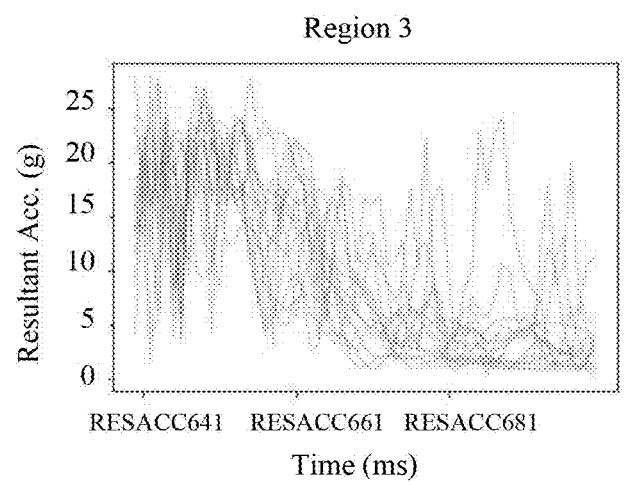
FIG. 28B illustrates a graph depicting shots that are above the decision boundary among the shots hit in the third region of the bat, according to an embodiment herein.

FIG. 27 illustrates a scatter plot depicting a use of a decision boundary 2701 for clustering of shots hit on the third region 403 of the bat 101 shown in FIG. 4, according to an embodiment herein. The sweet spot detection module uses the decision boundary 2701 to separate the shots into two clusters. The scatter plot illustrated in FIG. 27, has 75% of the shots below the decision boundary 2701. FIG. 28A illustrates a graph depicting shots that are below the decision boundary 2701 among the shots hit in the third region 403 of the bat 101, according to an embodiment herein. FIG. 28B illustrates a graph depicting shots that are above the decision boundary 2701 among the shots hit in the third region 403 of the bat 101, according to an embodiment herein.

Figure 29:
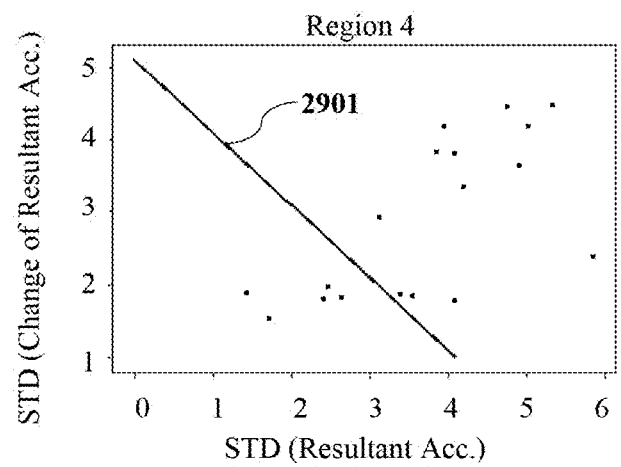
FIG. 29 illustrates a scatter plot depicting a use of a decision boundary for clustering of shots hit on the fourth region of the bat, according to an embodiment herein.
Figure 30A:
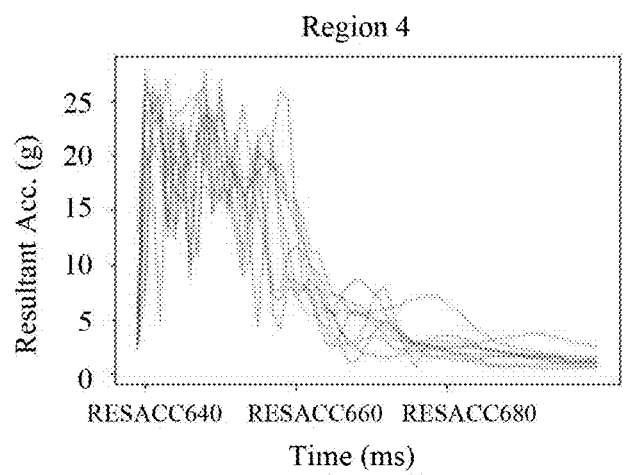
FIG. 30A illustrates a graph depicting shots that are below the decision boundary among the shots hit in the fourth region of the bat, according to an embodiment herein.
Figure 30B:
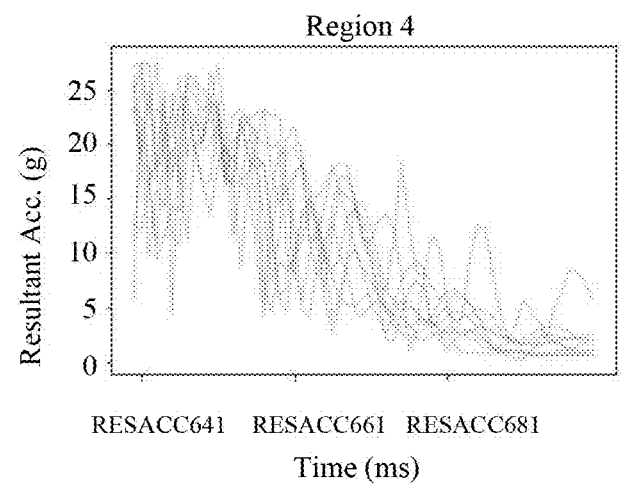
FIG. 30B illustrates a graph depicting shots that are above the decision boundary among the shots hit in the fourth region of the bat, according to an embodiment herein.

FIG. 29 illustrates a scatter plot depicting a use of a decision boundary 2901 for clustering of shots hit on the fourth region 404 of the bat 101 shown in FIG. 4, according to an embodiment herein. The sweet spot detection module uses the decision boundary 2901 to separate the shots into two clusters. The scatter plot illustrated in FIG. 29, has 25% of the shots below the decision boundary 2901. FIG. 30A illustrates a graph depicting shots that are below the decision boundary 2901 among the shots hit in the fourth region 404 of the bat 101, according to an embodiment herein. FIG. 30B illustrates a graph depicting shots that are above the decision boundary 2901 among the shots hit in the fourth region 404 of the bat 101, according to an embodiment herein.

The scatter plots illustrated in FIG. 23, FIG. 25, FIG. 27, and FIG. 29 indicate that shots that lie above the respective decision boundaries 2301, 2501, 2701, and 2901 contain more energy as the loss has not happened post impact and hence the player feels jitteriness. The shots that are lying below the respective decision boundaries 2301, 2501, 2701, and 2901, that is, towards the origin, contain less amount of physical disturbance after the impact has taken place with the ball.

Figure 31:
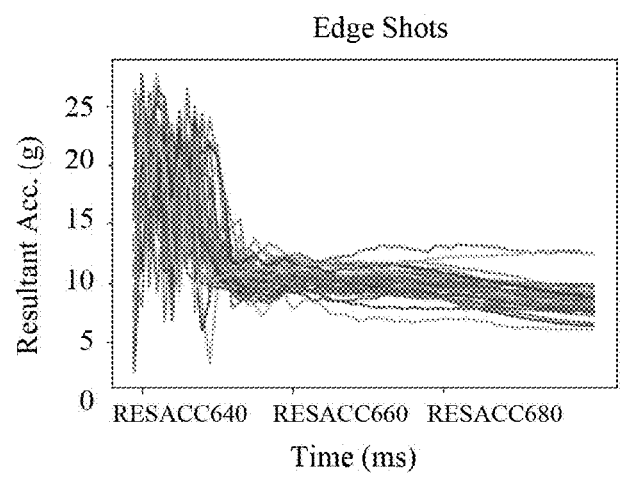
FIG. 31 illustrates a graph depicting a resultant acceleration of a swing of the bat for edge shots, according to an embodiment herein.
Figure 32:
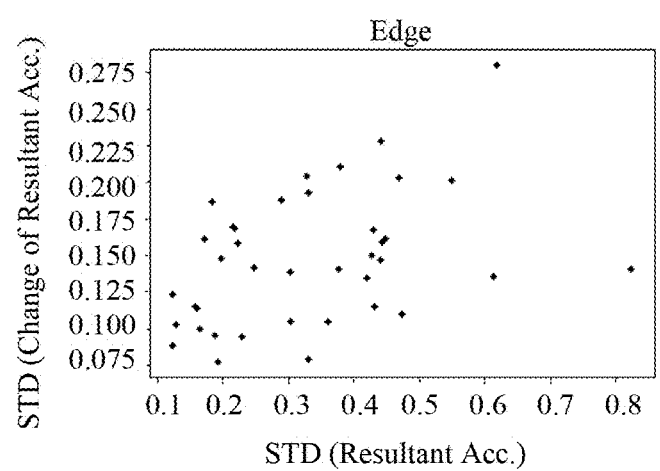
FIG. 32 illustrates a scatter plot depicting a standard deviation of a resultant acceleration versus a standard deviation of a change in resultant acceleration for the edge shots, according to an embodiment herein.

According to an embodiment herein, the sweet spot detection module analyses edge shots to improve the detection of a sweet spot. Edge shots take place when the ball slightly touches the bat towards the edge of the bat blade. According to this embodiment, the data extraction module extracts data related to edge shots from the sensor data received from the sensor device 102 illustrated in FIGS. 1-2. The data tagging module tags the extracted edge shots after recording each edge shot. FIG. 31 illustrates a graph depicting a resultant acceleration of a swing of the bat for edge shots, according to an embodiment herein. The graph illustrated in FIG. 31 shows all the edges superimposed in a single plot. Each line illustrated in FIG. 31 represents the resultant acceleration of a swing. FIG. 32 illustrates a scatter plot depicting a standard deviation of a resultant acceleration versus a standard deviation of a change in resultant acceleration for the edge shots, according to an embodiment herein. The scatter plot illustrated in FIG. 32, indicates the standard deviation of the resultant acceleration versus the standard deviation of a change in the resultant acceleration for a period of 20 milliseconds post 20 milliseconds of the impact. On comparing the scatter plot illustrated in FIG. 32 with typical swings, the sweet spot detection module determines that the scatter lies in an area less than 1 deviation in both the X-axis and the Y-axis, as there is minimal fluctuation in the acceleration after 20 milliseconds of the impact. Edge shots typically do not leave vibrations for a long duration after the impact has happened. The standard deviation in the two features, that is, the resultant acceleration and the change in the resultant acceleration, is high for most of the shots, which makes edge shots unique.

According to an embodiment herein, the sweet spot detection module combines different cases, that is, the case where the bat is in motion and the case where edge shots are considered and compares them for detecting and distinguishing sweet spot shots from non-sweet spot shots and edge shots. The sweet spot detection module combines filters on all data sets that are explored for the different regions 401, 402, 403, and 404 of the bat 101 shown in FIG. 4.

Figure 33A:
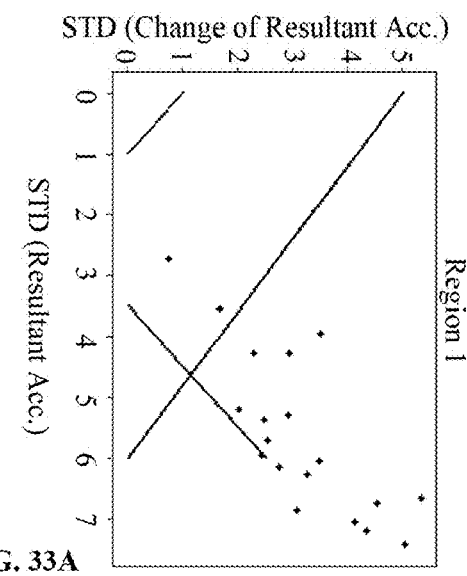
FIG. 33A illustrates a scatter plot of all the data sets combined together for the shots hit in the first region of the bat, according to an embodiment herein.
Figure 33B:
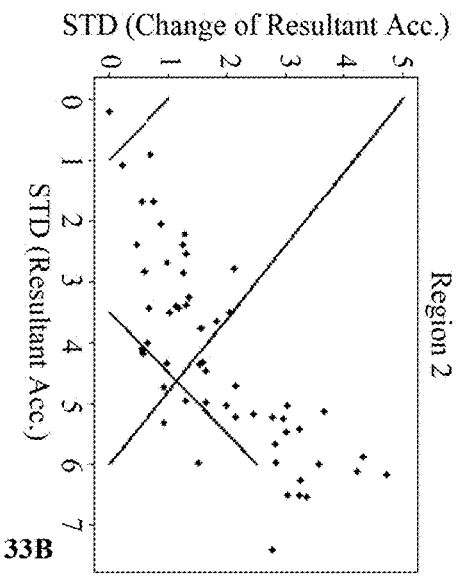
FIG. 33B illustrates a scatter plot of all the data sets combined together for the shots hit in the second region of the bat, according to an embodiment herein.
Figure 33C:
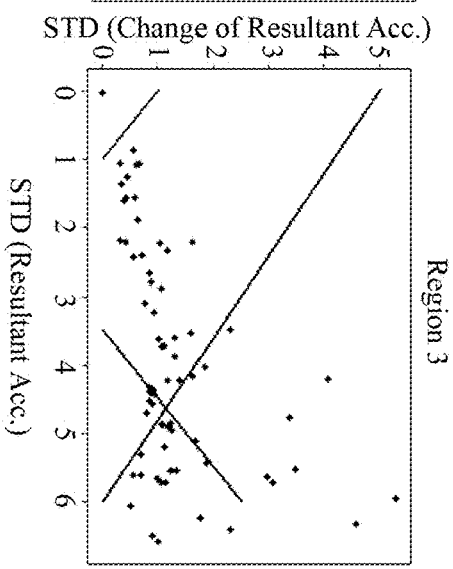
FIG. 33C illustrates a scatter plot of all the data sets combined together for the shots hit in the third region of the bat, according to an embodiment herein.
Figure 33D:
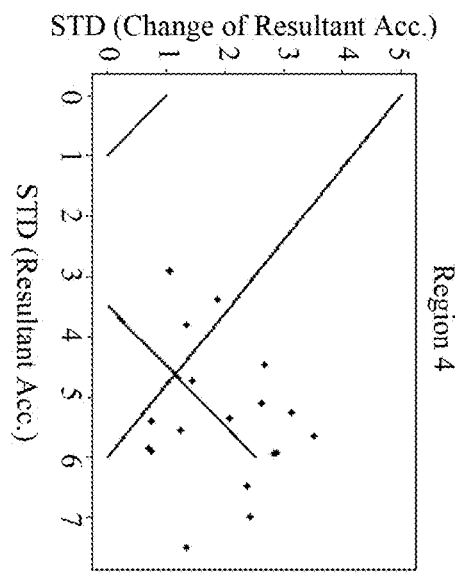
FIG. 33D illustrates a scatter plot of all the data sets combined together for the shots hit in the fourth region of the bat, according to an embodiment herein.
Figure 33E:
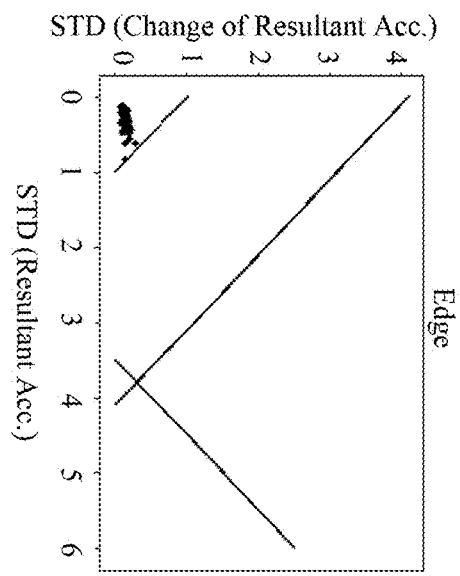
FIG. 33E illustrates a scatter plot of all the data sets combined together for the edge shots, according to an embodiment herein.

FIG. 33A illustrates a scatter plot of all the data sets combined together for the shots hit in the first region 401 of the bat 101 shown in FIG. 4, according to an embodiment herein. FIG. 33B illustrates a scatter plot of all the data sets combined together for the shots hit in the second region 402 of the bat 101 shown in FIG. 4, according to an embodiment herein. FIG. 33C illustrates a scatter plot of all the data sets combined together for the shots hit in the third region 403 of the bat 101 shown in FIG. 4, according to an embodiment herein. FIG. 33D illustrates a scatter plot of all the data sets combined together for the shots hit in the fourth region 404 of the bat 101 shown in FIG. 4, according to an embodiment herein. FIG. 33E illustrates a scatter plot of all the data sets combined together for the edge shots, according to an embodiment herein.

According to an embodiment herein, based on the edge shots, the sweet spot detection module identifies another decision boundary or line that helps in separating the edge shots from typical shots. Adding the decision boundary across the typical shots indicates that a substantially small percentage of shots, for example, about 1% of the shots lie in a region towards the origin, while the rest of the typical shots are above the decision boundary away from the origin, thereby classifying the edge shots from the typical shots.

The above experiments indicate that the sensor device 102 with at least one accelerometer 106 mounted on the bat 101 as illustrated in FIGS. 1-2, is capable of detecting a sweet spot on the bat 101. According to another embodiment herein, the sensor device 102 with at least one accelerometer 106 mounted on the bat 101, in communication with the user device 103 and the sweet spot detection server 105 as illustrated in FIGS. 1-2, is also capable of detecting a sweet spot on the bat 101. Furthermore, the sweet spot detection module determines that the sweet spot is not one point on the bat blade, but is a wide spectrum spread over the bat 101, where a majority of the sweet spot shots occur in the region, for example, about three quarters the length of the bat surface from the handle 101c towards the toe 101e as illustrated in FIG. 4. As disclosed above, the experiments are performed in two parts. According to an embodiment herein, in the first part, the sweet spot detection module detects and distinguishes the sweet spot shots from the non-sweet spot shots with a good level of confidence, for example, about 71% confidence, using the machine learning module that executes one or more machine learning algorithms. According to another embodiment herein, in the first part, the sweet spot detection module detects and distinguishes the sweet spot shots from the non-sweet spot shots using two features, that is, the standard deviation of resultant acceleration versus the standard deviation of a change in resultant acceleration, and a decision boundary or a line, with a good level of confidence, for example, about 77% confidence. The system and the method disclosed herein are computationally efficient to run on miniature devices without any other dependency and predict the results in near real time. According to an embodiment herein, in the second part, the sweet spot detection module detects and distinguishes the sweet spot shots from the non-sweet spot shots using two features, that is, the standard deviation of resultant acceleration versus the standard deviation of a change in resultant acceleration, and decision boundaries or lines. According to this embodiment, in the second part, the sweet spot detection module executes the experiment on actual shots and identifies sweet spot shots with about 75% accuracy on the actual sweet spot shots. Furthermore, in the second part, the sweet spot detection module analyzes the edge shots and implements a method for separating the edge shots from the sweet spot shots. The two parts executed by the sweet spot detection module provide a holistic solution which takes into consideration a stationary bat and a moving bat, in addition to detecting edge shots to cover multiple cases where sweet spot shots overlap.

Consider an example where the sensor device 102 illustrated in FIGS. 1-2, comprising a 3-axis micro-electromechanical system (MEMS) accelerometer sensor is mounted on a rear surface of a bat for detecting whether a ball hit on the sweet spot of the bat or on another location on the bat. In this example, the sensor device 102 comprises an LSM6DSM system-in-package with a three-dimensional (3D) digital accelerometer and a 3D digital gyroscope, an STM321476 microcontroller, and a BlueNRG-MS Bluetooth low energy (BLE) single-mode network processor embedded on a printed circuit board. The sensor device 102 is attached to the bat below the handle and, for example, about 40 centimeters above a sweet spot region of the bat using a fastener, for example, a hook and look fastener. According to an embodiment herein, the sampling rate of the accelerometer of the sensor device 102 is, for example, within a range between about 800 Hz to about 6600 Hz. For example, an operator configures the sampling rate of the accelerometer of the sensor device 102 to about 1666 Hz to sample the vibration dynamics of the bat at the point of impact with the ball at a moderately high speed. A player enters feedback data through a mobile application deployed on the user device. The data tagging module tags the data collected by the sensor device 102 based on the feedback data according to the player's feeling in their wrist. When the ball hits the bat at a non-sweet spot region on the bat, the player typically feels bad vibrations in their wrist and when the ball hits the bat at a sweet spot region on the bat, the player typically feels minimal vibrations in their wrist. The data tagging module tags each shot based on the wrist vibration feedback received from the player. According to an embodiment herein, the player provides feedback by tapping the bat or clicking a button configured on the bat. According to another embodiment herein, the player provides feedback by entering a Yes or No input on the mobile application deployed on the user device. In this example, the sensor device 102 collects and stores 100 samples from the accelerometer from the impact point in the three axes, that is, the X-axis, the Y-axis, and the Z-axis, which corresponds to 60 milliseconds post ball impact. When the ball hits the bat, the bat undergoes a high rate of change of acceleration, which is referred to as a jerk. The sensor device 102 continuously searches for a jerk with the help of an embedded function, for example, a tap function of the accelerometer. The tap function detects a jerk by analyzing the slope of the input acceleration. When the tap function detects the jerk, the accelerometer raises a hardware interrupt to the microcontroller or processor of the sensor device 102. The microcontroller or the processor detects the jerk as a ball impact point and start accumulating accelerometer data for 60 milliseconds.

Figure 34A:
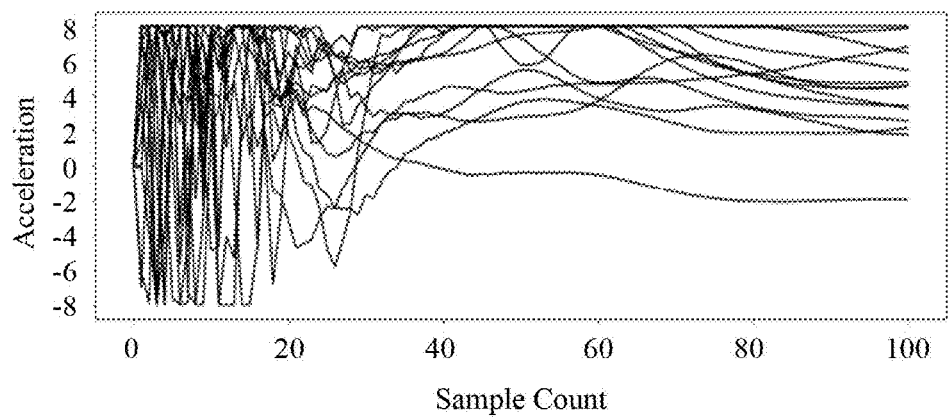
FIG. 34A illustrates a graph depicting vibration data associated with acceleration along an X-axis for sweet spot shots.
Figure 34B:
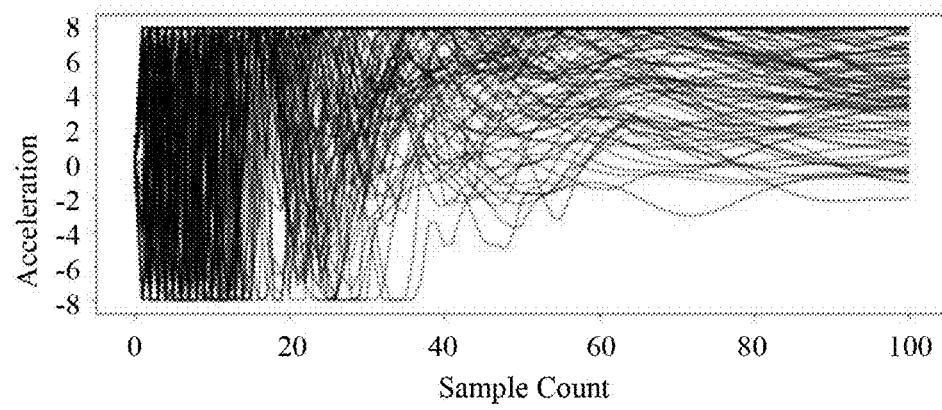
FIG. 34B illustrates a graph depicting vibration data associated with acceleration along the X-axis for non-sweet spot shots.
Figure 35A:
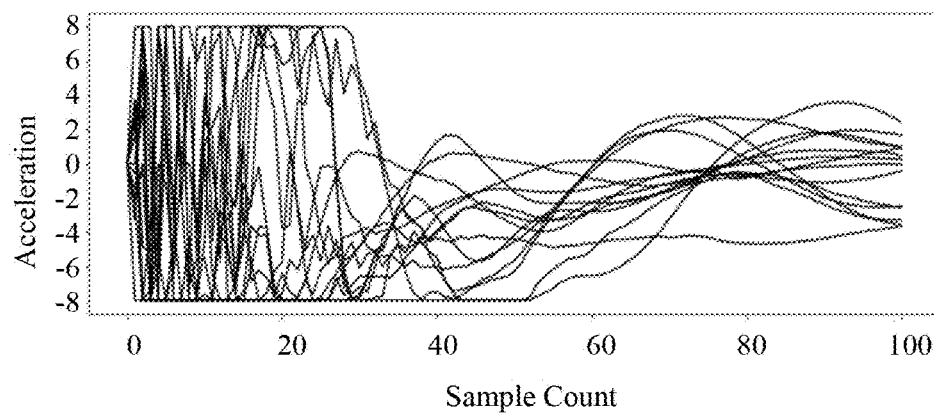
FIG. 35A illustrates a graph depicting vibration data associated with acceleration along a Y-axis for sweet spot shots.
Figure 35B:
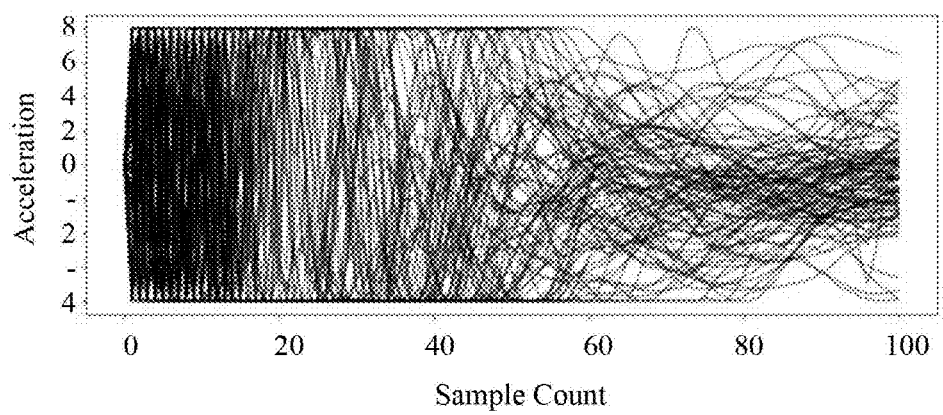
FIG. 35B illustrates a graph depicting vibration data associated with acceleration along the Y-axis for non-sweet spot shots.
Figure 36A:
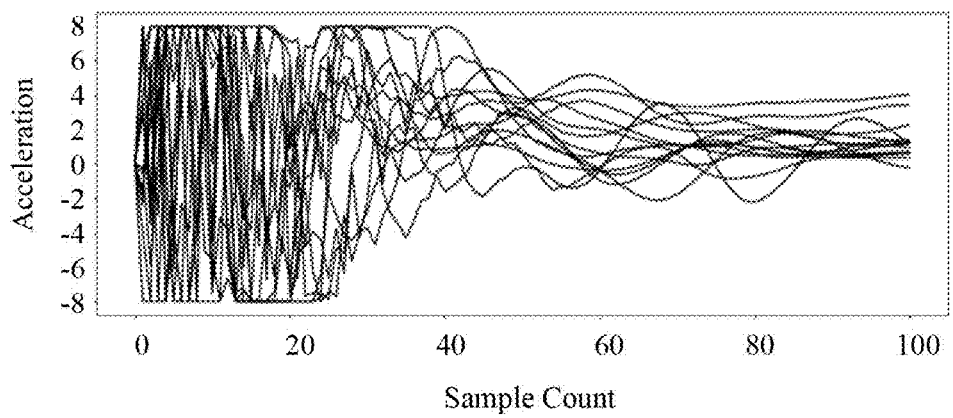
FIG. 36A illustrates a graph depicting vibration data associated with acceleration along a Z-axis for sweet spot shots.
Figure 36B:
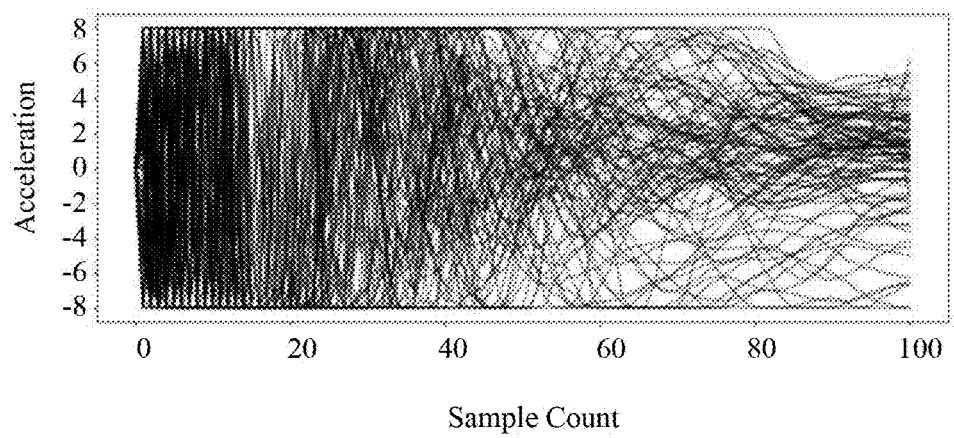
FIG. 36B illustrates a graph depicting vibration data associated with acceleration along the Z-axis for non-sweet spot shots.

FIGS. 34A-34B, FIGS. 35A-35B, and FIGS. 36A-36B represent after impact information for 60 milliseconds. FIG. 34A illustrates a graph depicting vibration data associated with acceleration along an X-axis for sweet spot shots. FIG. 34B illustrates a graph depicting vibration data associated with acceleration along the X-axis for non-sweet spot shots. FIGS. 34A-34B indicate that in the X-axis, non-sweet spot shots or bad shots have more amplitude than sweet spot shots from the sample number 20 to 35 and have a higher fluctuation for a longer duration of time. FIG. 35A illustrates a graph depicting vibration data associated with acceleration along a Y-axis for sweet spot shots. FIG. 35B illustrates a graph depicting vibration data associated with acceleration along the Y-axis for non-sweet spot shots. FIGS. 35A-35B indicate that in the Y-axis, non-sweet spot shots or bad shots have more amplitude than sweet spot shots from the sample number 40 to 80 and have a higher fluctuation for a longer duration of time. FIG. 36A illustrates a graph depicting vibration data associated with acceleration along a Z-axis for sweet spot shots. FIG. 36B illustrates a graph depicting vibration data associated with acceleration along the Z-axis for non-sweet spot shots. FIGS. 36A-36B indicate that in the Z-axis, non-sweet spot shots or bad shots have more amplitude than sweet spot shots from the sample number 30 to 60 and have a higher fluctuation for a longer duration of time.

Figure 37A:
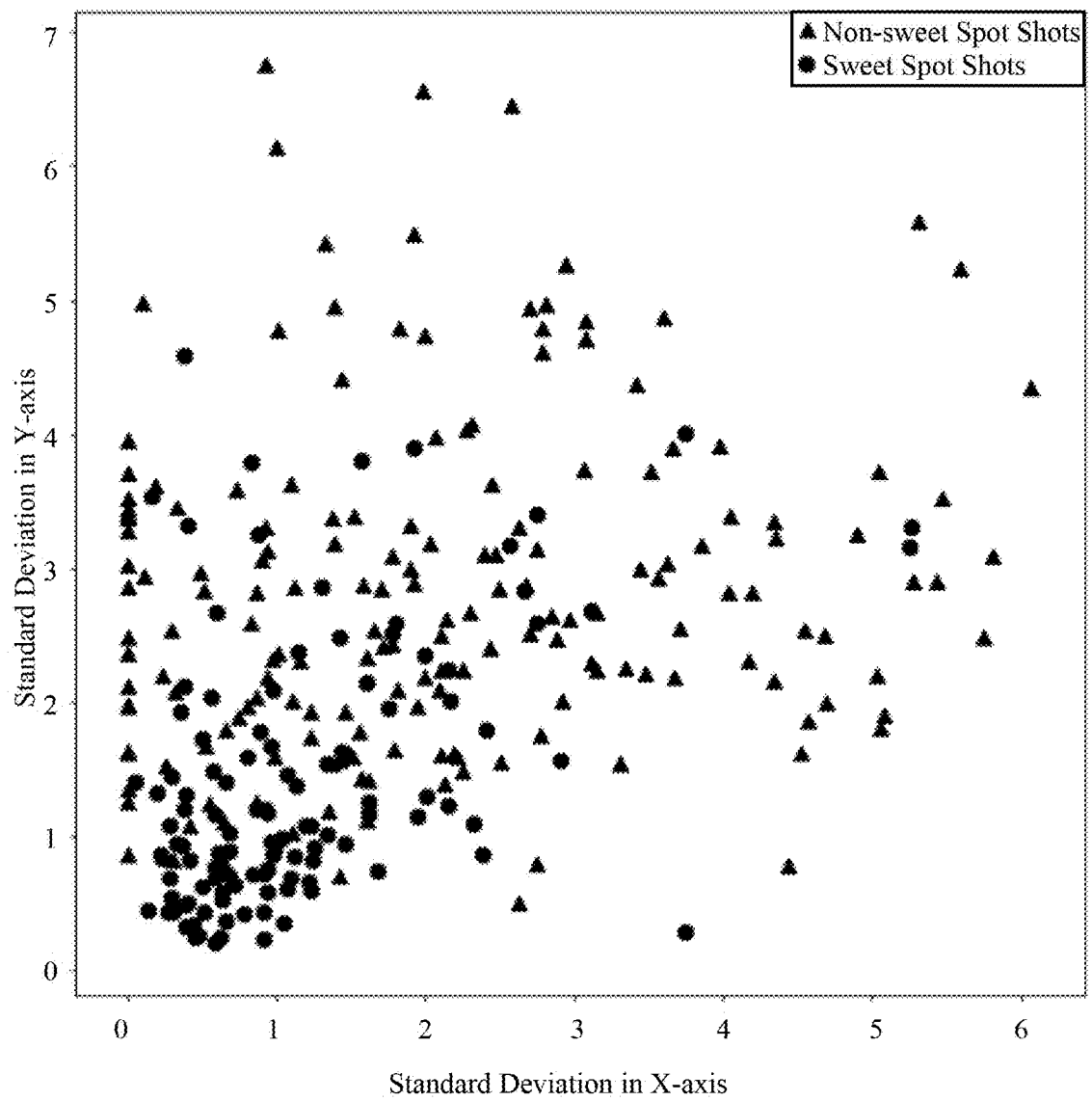
FIGS. 37A-37C illustrate scatter plots depicting standard deviation applied on the shots hit in the four regions of the bat in the X-axis, the Y-axis, and the Z-axis for detecting and distinguishing sweet spot shots from non-sweet spot shots on the bat.
Figure 37B:
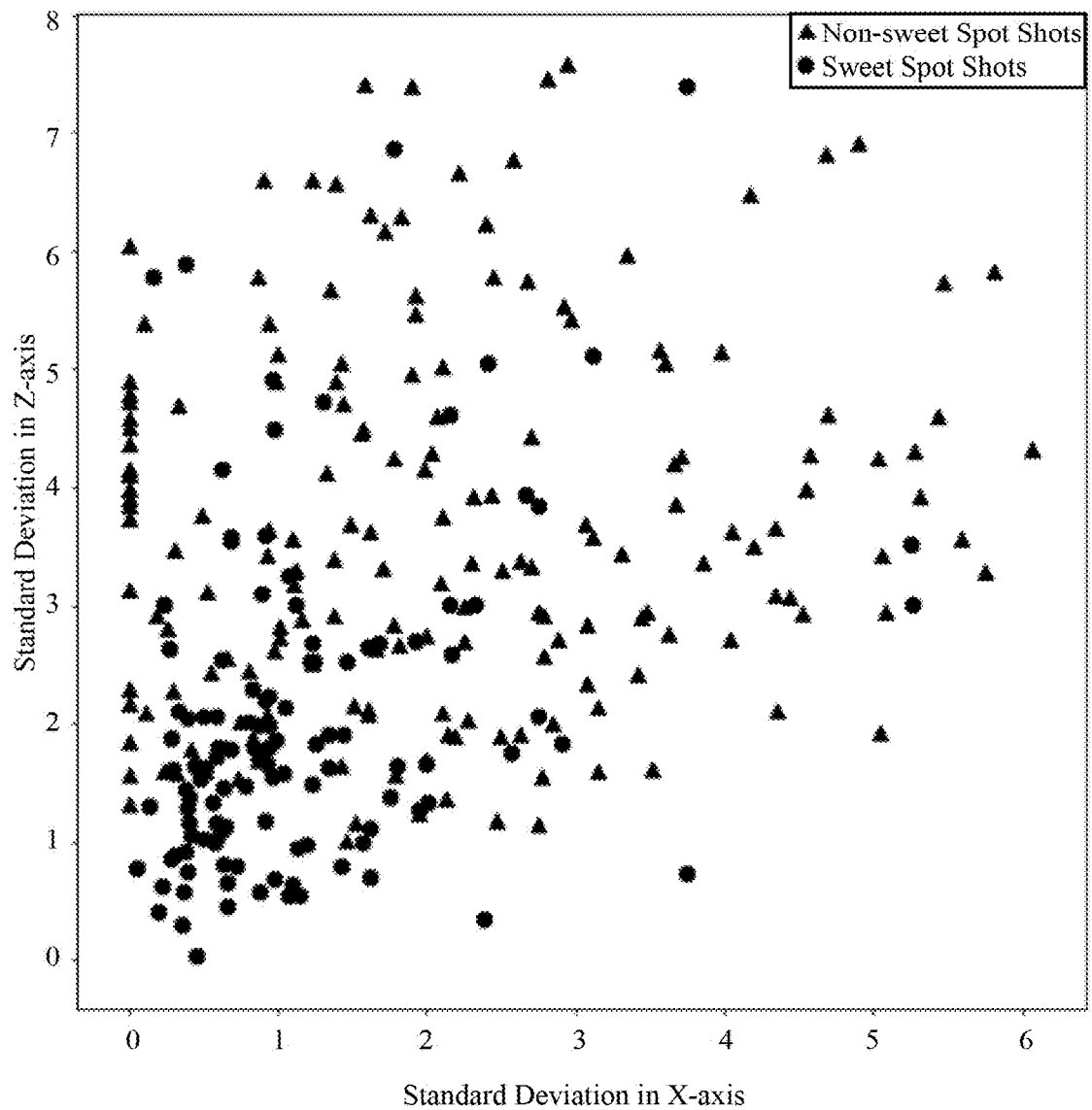
Figure 37C:
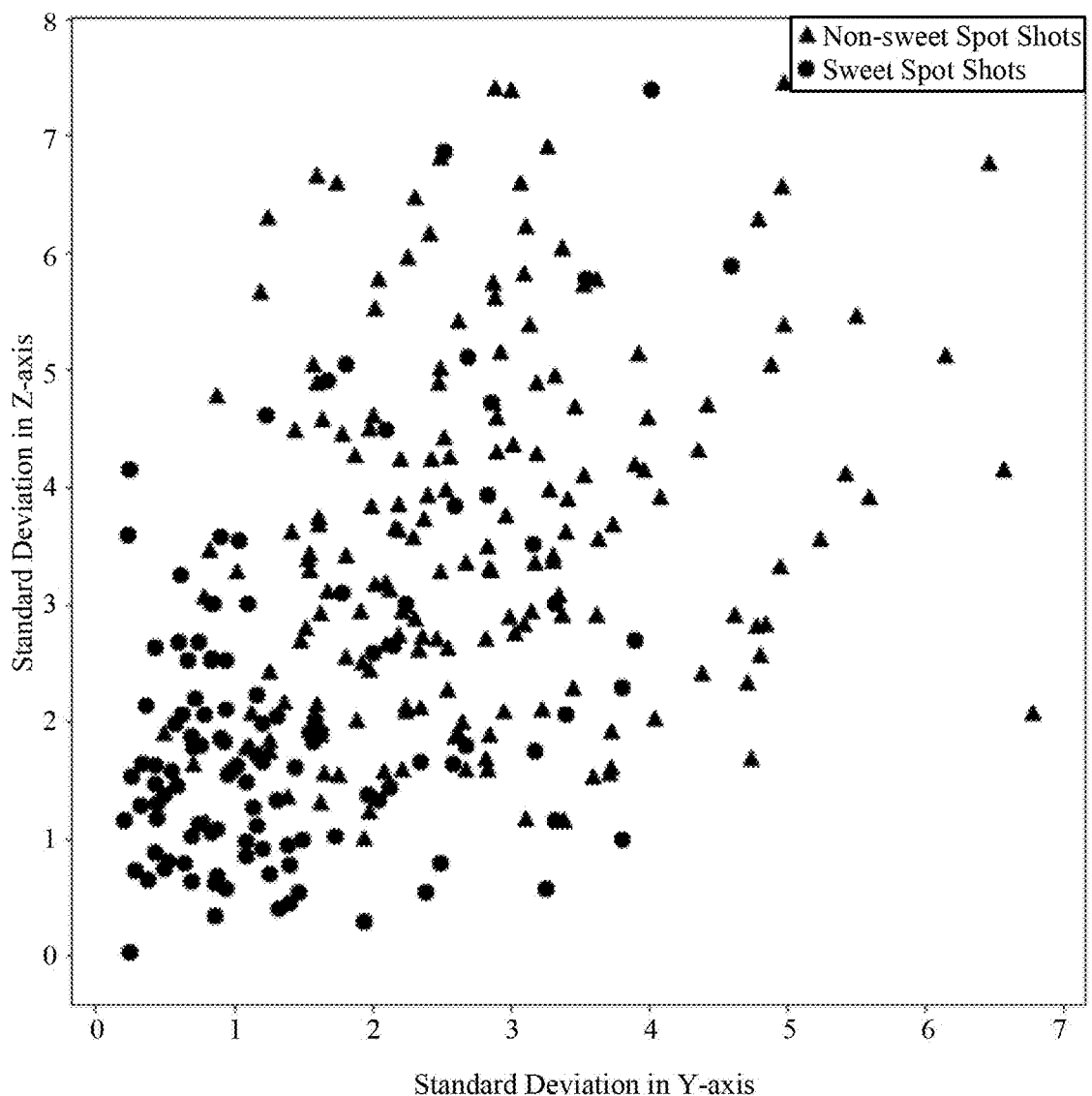

FIGS. 37A-37C illustrate scatter plots depicting standard deviation applied on the shots hit in the four regions of the bat in the X-axis, the Y-axis, and the Z-axis for detecting and distinguishing sweet spot shots from non-sweet spot shots on the bat. On applying a standard deviation on the four regions of the bat on each of the X-axis, the Y-axis, and the Z-axis, most of the sweet spot shots appear in the bottom region of the graphs as illustrated in FIGS. 37A-37C. In FIGS. 37A-37C, the dots represent sweet spot shots and the triangles represent non-sweet spot shots or bad shots.

Figure 38A:
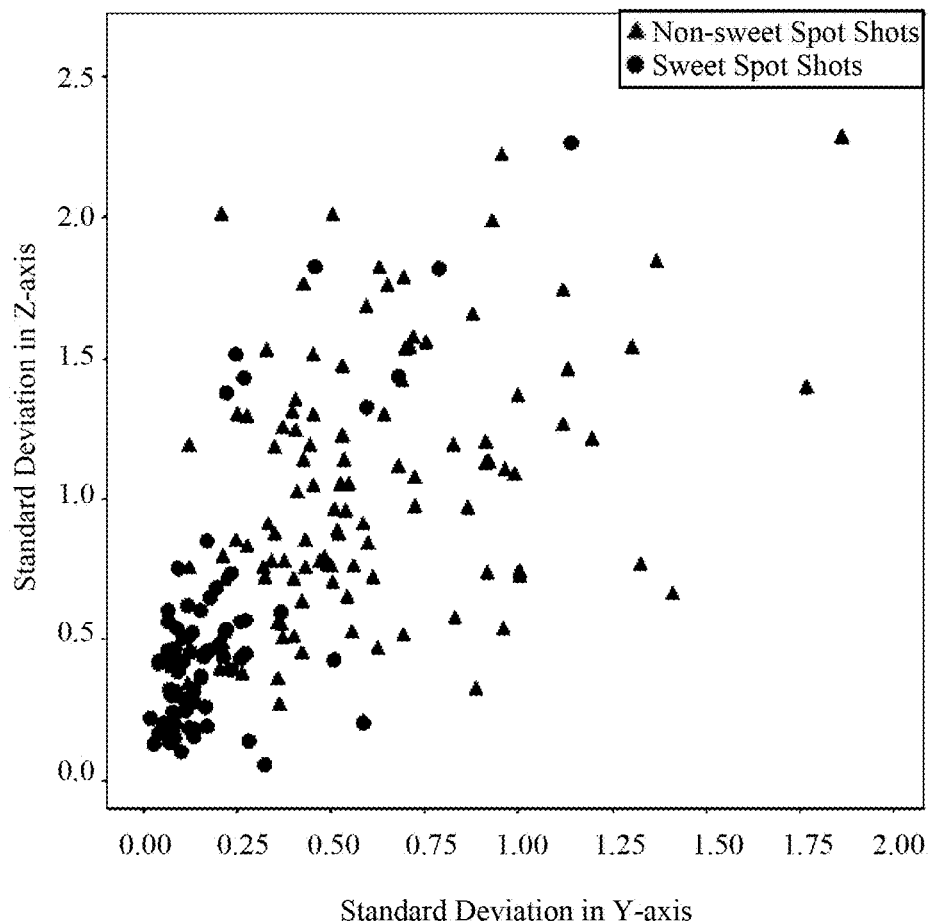
FIGS. 38A-38B illustrate scatter plots depicting results of application of a high pass filter on data of the shots hit in the four regions of the bat in the Y-axis and the Z-axis for detecting and distinguishing sweet spot shots from non-sweet spot shots on the bat.
Figure 38B:
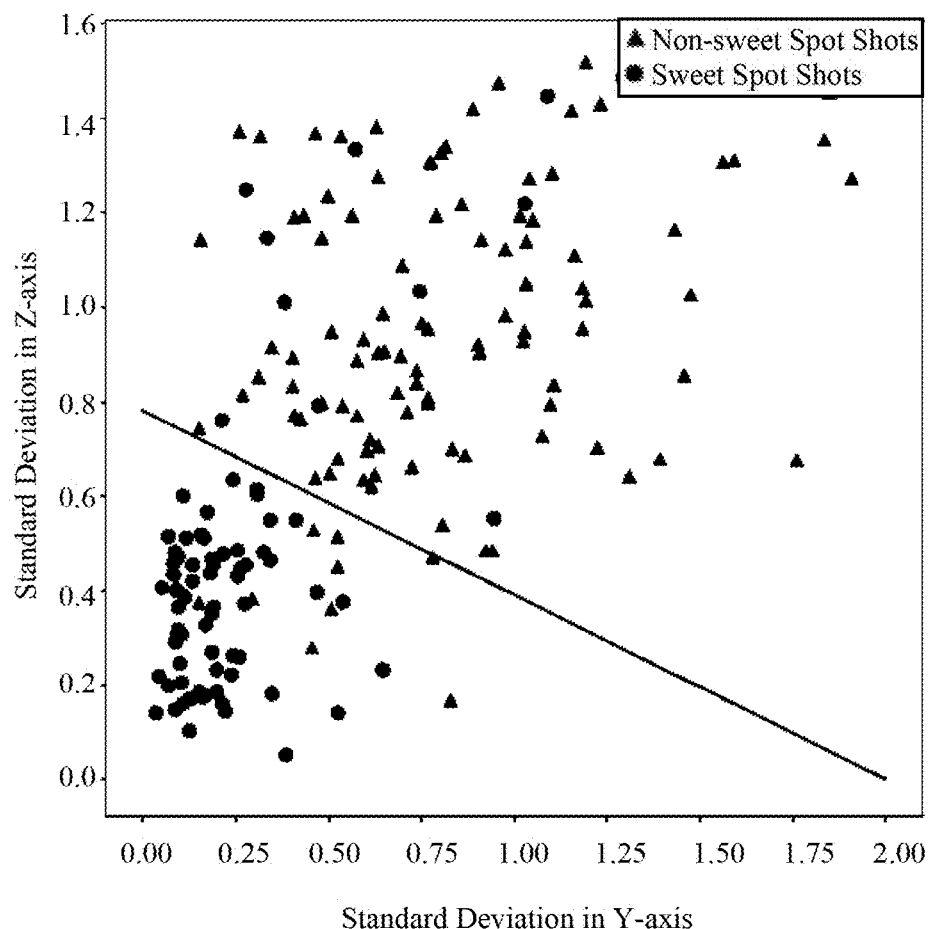

According to an embodiment herein, the sweet spot detection module applies a high pass filter with a cut-off frequency of, for example, 100 Hz on the Y-axis data and the Z-axis data to remove the effect of the bat swing and slightly changes the range of selected samples. That is, the sweet spot detection module changes the range on the X-axis, for example, to 40-70 and the range on the Y-axis, for example, to 30-70. FIGS. 38A-38B illustrate scatter plots depicting results of the application of the high pass filter on data of the shots hit in the four regions of the bat in the Y-axis and the Z-axis for detecting and distinguishing sweet spot shots from non-sweet spot shots on the bat. The sweet spot detection module determined that the applied high pass filter on the absolute of the Y-axis and the Z-axis made a better separation between the sweet spot shots and the non-sweet spot shots or the bad shots. In FIGS. 38A-38B, the dots represent sweet spot shots and the triangles represent non-sweet spot shots or bad shots.

Figure 39A:
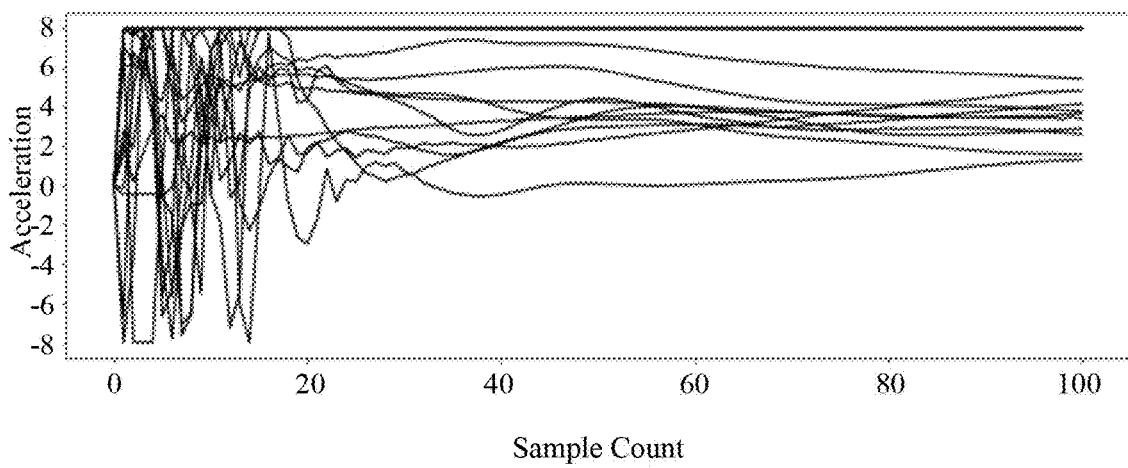
FIG. 39A illustrates a graph depicting vibration data associated with acceleration along an X-axis for edge shots.
Figure 39B:
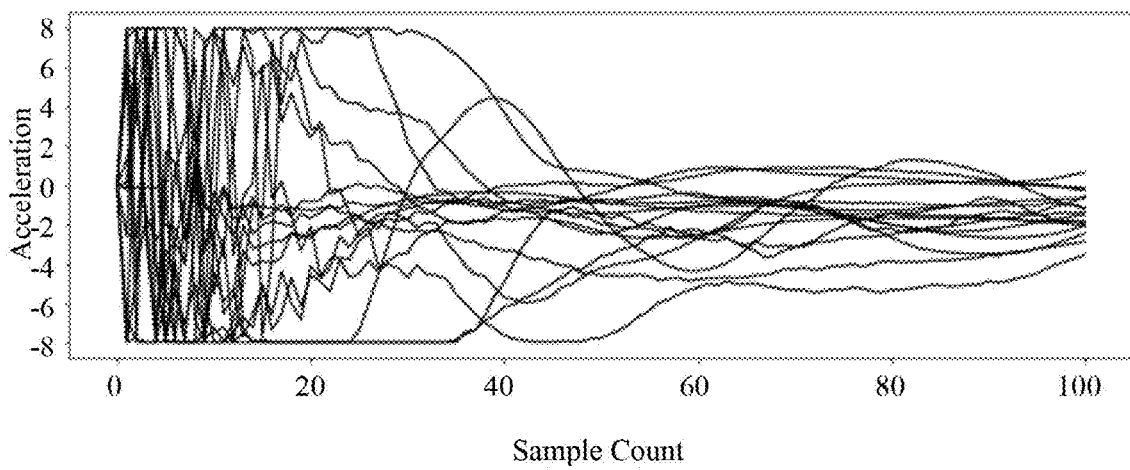
FIG. 39B illustrates a graph depicting vibration data associated with acceleration along a Y-axis for edge shots.
Figure 39C:
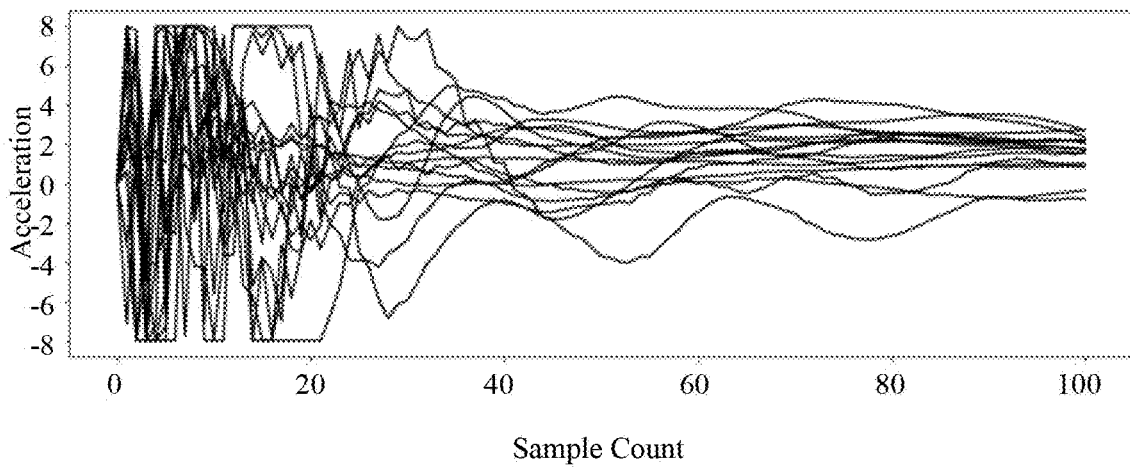
FIG. 39C illustrates a graph depicting vibration data associated with acceleration along a Z-axis for edge shots.

FIG. 39A illustrates a graph depicting vibration data associated with acceleration along an X-axis for edge shots. By analysing the vibration data, on the X-axis, from sample numbers 20-50, the sweet spot detection module determines that edge shots have a lesser fluctuation than sweet spot shots. FIG. 39B illustrates a graph depicting vibration data associated with acceleration along a Y-axis for edge shots. By analysing the vibration data, on the Y-axis, from sample numbers 20-40, the sweet spot detection module determines that edge shots have a lesser fluctuation than sweet spot shots. FIG. 39C illustrates a graph depicting vibration data associated with acceleration along a Z-axis for edge shots. By analysing the vibration data, on the Z-axis, from sample numbers 20-45, the sweet spot detection module determines that edge shots have a lesser fluctuation than sweet spot shots. The sweet spot detection module determines that the X-axis and the Z-axis have a better separation between the sweet spot shots and the edge shots.

Figure 40:
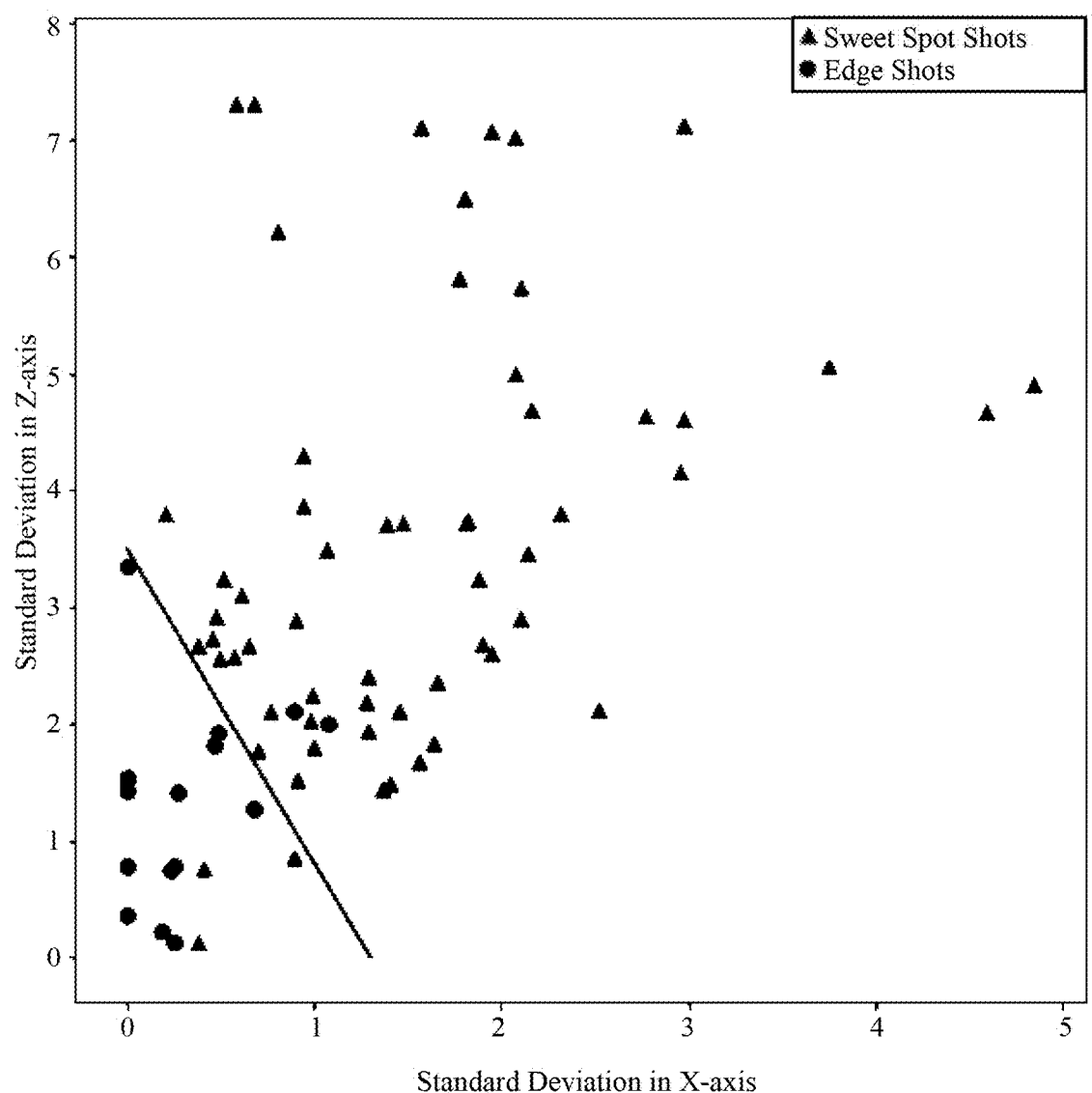
FIG. 40 illustrates a scatter plot depicting results of application of a standard deviation on data of the shots hit in the four regions of the bat in the X-axis and the Z-axis for detecting and distinguishing sweet spot shots from edge shots on the bat.

According to an embodiment herein, the sweet spot detection module applies a standard deviation on the X-axis and the Z-axis and generates a scatter plot. FIG. 40 illustrates a scatter plot depicting results of application of the standard deviation on data of the shots hit in the four regions of the bat in the X-axis and the Z-axis for detecting and distinguishing sweet spot shots from edge shots on the bat. The scatter plot illustrated in FIG. 40 shows that edge shots have a lesser standard deviation on both the axes, that is, on the X-axis and the Z-axis, compared to sweet spot shots in the selected range.

The system and the method disclosed herein implement one or more specific computer programs for detecting a sweet spot on a bat. The system and the method disclosed herein improve the functionality of a computer and provide an improvement in sports analysis and training technology related to detecting a sweet spot on a bat as follows: On implementing the method disclosed herein, the sensors of the sensor device 102 continuously record multiple event-based data elements associated with multiple shots on different of regions on the bat within a configurable time period in real time or near real time. Then, the data extraction module, through the use of a separate and autonomous computer program, extracts and stores the event-based data elements received from the sensors of the sensor device. The data tagging module aggregates and tags each of the event-based data elements based on a position of each of the shots at each of the regions on the bat where a ball is hit and feedback data received from a player who hit the ball with the bat. Then, the sweet spot detection module, through the use of separate and autonomous computer programs, determines responses produced by the bat at each of the regions during and after each of the shots is hit by analysing the event-based data elements; and detects and distinguishes a sweet spot shot from a non-sweet spot shot and an edge shot among the shots based on the determined responses as disclosed in the detailed descriptions of FIGS. 1-38B.

The focus of the system and the method disclosed herein is on an improvement to sports analysis and training technology and computer functionalities for detecting a sweet spot on a bat, and not on tasks for which a generic computer is used in its ordinary capacity. Rather, the system and the method disclosed herein are directed to a specific improvement to the way processors in the system operate, embodied in, for example, continuously recording multiple event-based data elements associated with multiple shots on different of regions on the bat within a configurable time period in real time or near real time; extracting and storing the event-based data elements received from the sensors of the sensor device; aggregating and tagging each of the event-based data elements; determining responses produced by the bat at each of the regions during and after each of the shots is hit by analysing the event-based data elements; and detecting and distinguishing a sweet spot shot from a non-sweet spot shot and an edge shot among the shots based on the determined responses.

In the method disclosed herein, the design and the flow of data and interactions between the sensor device 102, the user device 103, and the sweet spot detection server 105 of the system 100 illustrated in FIGS. 1-2, are deliberate, designed, and directed. The interactions between the sensor device 102, the user device 103, and the sweet spot detection server 105 allow the system 100 to detect sweet spot shot on a bat. In the system 100 disclosed herein, the sensor device 102 interfaces with the user device 103 and/or the sweet spot detection server 105, and therefore more than one specifically programmed computer system is used for detecting a sweet spot on a bat. The method steps performed by the system disclosed herein require one or more separate computer programs and subprograms, the execution of which cannot be performed by a person using a generic computer with a generic program. The method steps performed by the system disclosed herein are tangible, provide useful results, and are not abstract. The hardware and software implementation of the system disclosed herein and one or more processors is an improvement in sports analysis and training technology.

The various embodiments herein provide a system and a method for sweet spot detection. The system and method disclosed herein makes use of miniaturized sensors placed on a bat to measure the physical aspect of a bat swing, which results in a substantially accurate 3D motion recreation of each swing. The system and the method disclosed herein help in determining a sweet spot region on a bat and a sweet spot shot using a portable system. The system is suitable for use on the field for training and coaching in a near instantaneous time period. Furthermore, the sweet spot detection process followed by the system and the method disclosed herein is completely automated and cost-effective. The system and the method disclosed herein uses one or more machine learning algorithms to offer various types of analysis and modeling to users.

It is apparent in different embodiments that the various methods, algorithms, and computer-readable programs disclosed herein are implemented on non-transitory, computer-readable storage media appropriately programmed for computing devices. The non-transitory, computer-readable storage media participate in providing data, for example, instructions that are read by a computer, a processor or a similar device. In different embodiments, the "non-transitory, computer-readable storage media" also refer to a single medium or multiple media, for example, a centralized database, a distributed database, and/or associated caches and servers that store one or more sets of instructions that are read by a computer, a processor or a similar device. The "non-transitory, computer-readable storage media" also refer to any medium capable of storing or encoding a set of instructions for execution by a computer, a processor or a similar device and that causes a computer, a processor or a similar device to perform any one or more of the methods disclosed herein. According to an embodiment herein, the computer programs that implement the methods and algorithms disclosed herein are stored and transmitted using a variety of media, for example, the computer-readable media in various manners. According to an embodiment herein, hard-wired circuitry or custom hardware is used in place of, or in combination with, software instructions for implementing the processes of various embodiments. Therefore, the embodiments are not limited to any specific combination of hardware and software. Various aspects of the embodiments disclosed herein are implemented as programmed elements, or non-programmed elements, or any suitable combination thereof.

Where databases are described such as the data store 120 and the database 131 illustrated in FIG. 2, it will be understood by one of ordinary skill in the art that (i) alternative database structures to those described may be employed, and (ii) other memory structures besides databases may be employed. Any illustrations or descriptions of any sample databases disclosed herein are illustrative arrangements for stored representations of information. According to another embodiment, despite any depiction of the databases as tables, other formats including relational databases, object-based models, and/or distributed databases are used to store and manipulate the data types disclosed herein. According to an embodiment herein, object methods or behaviors of a database are used to implement various processes such as those disclosed herein. In another embodiment, the databases are, in a known manner, stored locally or remotely from a device that accesses data in such a database. In embodiments where there are multiple databases, the databases are integrated to communicate with each other for enabling simultaneous updates of data linked across the databases, when there are any updates to the data in one of the databases.

The embodiments disclosed herein are configured to work in a network environment comprising one or more computers that are in communication with one or more devices via a network. According to an embodiment herein, the computers communicate with the devices directly or indirectly, via a wired medium or a wireless medium such as the Internet, a local area network (LAN), a wide area network (WAN) or the Ethernet, a token ring, or via any appropriate communications mediums or combination of communications mediums. Each of the devices comprises processors, examples of which are disclosed above, that are adapted to communicate with the computers. According to an embodiment herein, each of the computers is equipped with a network communication device, for example, a network interface card, a modem, or other network connection device suitable for connecting to a network. Each of the computers and the devices executes an operating system. While the operating system may differ depending on the type of computer, the operating system provides the appropriate communications protocols to establish communication links with the network. Any number and type of machines may be in communication with the computers.

The embodiments disclosed herein are not limited to a particular computer system platform, processor, operating system, or network. One or more of the embodiments disclosed herein are distributed among one or more computer systems, for example, servers configured to provide one or more services to one or more client computers, or to perform a complete task in a distributed system. For example, one or more of the embodiments disclosed herein are performed on a client-server system that comprises components distributed among one or more server systems that perform multiple functions according to various embodiments. These components comprise, for example, executable, intermediate, or interpreted code, which communicate over a network using a communication protocol. The embodiments disclosed herein are not limited to be executable on any particular system or group of systems, and are not limited to any particular distributed architecture, network, or communication protocol.

The foregoing examples and illustrative implementations of various embodiments have been provided merely for explanation and are in no way to be construed as limiting of the embodiments disclosed herein. While the embodiments have been described with reference to various illustrative implementations, drawings, and techniques, it is understood that the words, which have been used herein, are words of description and illustration, rather than words of limitation. Furthermore, although the embodiments have been described herein with reference to particular means, materials, techniques, and implementations, the embodiments are not intended to be limited to the particulars disclosed herein; rather, the embodiments extend to all functionally equivalent structures, methods and uses, such as are within the scope of the appended claims. It will be understood by those skilled in the art, having the benefit of the teachings of this specification, that the embodiments disclosed herein are capable of modifications and other embodiments may be effected and changes may be made thereto, without departing from the scope and spirit of the embodiments disclosed herein.

What is claimed is:

1. A system for detecting a sweet spot on a bat, the system comprising:
   a sensor device operably coupled to a rear surface of the bat, wherein the sensor device comprises a plurality of sensors configured to continuously record a plurality of event-based data elements associated with a plurality of shots on a plurality of regions on the bat within a configurable time period in one of real-time and near real-time, and wherein the sensor device is communicatively coupled to a user device and a sweet spot detection server via a network;
   a non-transitory, computer-readable storage medium configured to store the plurality of event-based data elements and computer program instructions defined by a plurality of modules embedded in one of the sensor device, the user device, and the sweet spot detection server;
   at least one processor operably and communicatively coupled to the non-transitory, computer-readable storage medium and configured to execute the computer program instructions defined by the plurality of modules; and the plurality of modules comprising:
  a data extraction module configured to extract and store the plurality of event-based data elements received from the plurality of sensors of the sensor device;
  a data tagging module configured to aggregate and tag each of the plurality of event-based data elements received from the plurality of sensors, based on a position of each of the plurality of shots at each of the plurality of regions on the bat where a ball is hit; and
  a sweet spot detection module configured to:
    process the plurality of regions on the bat as a first region, a second region, a third region, and a fourth region, wherein the first region is located proximal to a handle and a shoulder of the bat, the second region is located proximal to the shoulder of the bat, the third region is located proximal to a toe of the bat, and the fourth region is located at the toe of the bat;
    classify each of the plurality of shots into a first part, a second part, and a third part, wherein the first part lies in a time duration before the ball hits the bat and when the bat gains momentum till the ball is hit or missed, the second part is a time instance when the ball collides with the bat, and the third part lies in a time duration when the bat loses momentum and attempts to return to rest;
    determine responses produced by the bat at the each of the first region, the second region, the third region, and the fourth region during and after each of the plurality of shots is hit, by analysing the plurality of event-based data elements; and
    detect and distinguish a sweet spot shot from a non-sweet spot shot and an edge shot among the plurality of shots based on determined responses; and
  wherein said sweet spot detection module is further configured to determine the responses produced by the bat at each of the first region, the second region, the third region, and the fourth region, by:
    computing a resultant acceleration of the bat during and after each of the plurality of shots for each of the first region, the second region, the third region, and the fourth region;
    computing a change in the resultant acceleration of the bat after each of the plurality of shots for each of the first region, the second region, the third region, and the fourth region using a statistical metric, and wherein the statistical metric is standard deviation; and
    analysing a deviation in the resultant acceleration versus a deviation in the change in the resultant acceleration of the bat associated with each of the plurality of shots for each of the first region, the second region, the third region, and the fourth region;
    and wherein the sweet spot detection module is configured to analyse the deviation in the resultant acceleration between two axes of the bat associated with each of the plurality of shots for each of the first region, the second region, the third region, and the fourth region by generating one or more decision boundaries as a classifier for clustering the plurality of shots and classifying each of the plurality of shots as the sweet spot shot, the non-sweet spot shot, and the edge shot, said sweet spot detection module further configured to cluster the plurality of shots into two parts in each of the regions by generating said one or more decision boundaries as the classifier.

2. The system according to claim 1, wherein the sensor device comprises:
  an accelerometer configured to measure an amount of force exerted on the ball by the bat during a swing of the bat;
  a gyroscope configured to measure a rate of rotation of the bat; and
  a magnetometer configured to measure a direction, strength, and a relative change of magnetic field at the each of the plurality of regions on the bat.

3. The system according to claim 1, wherein the plurality of event-based data elements comprise acceleration and angular velocity of the bat while the bat is in motion, and vibrations generated on the bat after each of the plurality of shots.

4. The system according to claim 3, wherein each of the plurality of shots comprises an impact of the ball on the bat, and is represented in terms of the acceleration in three dimensions and the angular velocity in three axes, and wherein the plurality of shots comprise sweet spot shots, non-sweet spot shots, and edge shots.

5. The system according to claim 1, wherein the plurality of modules comprise a noise filter configured to filter out noise from the plurality of event-based data elements.

6. The system according to claim 1, wherein the plurality of modules comprise a machine learning module configured to predict one or more of the regions on the bat where the sweet spot shot is detected, based on the standard deviation in three axes.

7. A method for detecting a sweet spot on a bat, the method comprising steps of:
  operably coupling a sensor device comprising a plurality of sensors to a rear surface of the bat, wherein the sensor device is communicatively coupled to a user device and a sweet spot detection server via a network;
  configuring a data extraction module, a data tagging module, and a sweet spot detection module in one of the sensor device, the user device, and the sweet spot detection server;
  continuously recording, by the plurality of sensors of the sensor device, a plurality of event-based data elements associated with a plurality of shots on a plurality of regions on the bat within a configurable time period in one of real-time and near real-time, and wherein said plurality of regions include a first region, a second region, a third region, and a fourth region, and wherein the first region is located proximal to a handle and a shoulder of the bat, the second region is located proximal to the shoulder of the bat, the third region is located proximal to a toe of the bat, and the fourth region is located at the toe of the bat;
  extracting and storing, by the data extraction module, the plurality of event-based data elements;
  aggregating and tagging, by the data tagging module, each of the plurality of event-based data elements recorded by the plurality of sensors, based on a position of each of the plurality of shots at each of the first region, the second region, the third region, and the fourth region on the bat where a ball is hit;
  classifying, by the sweet spot detection module, each of the plurality of shots into a first part, a second part, and a third part, wherein the first part lies in a time duration before the ball hits the bat and when the bat gains momentum till the ball is hit or missed, the second part is a time instance when the ball collides with the bat, and the third part lies in a time duration when the bat loses momentum and attempts to return to rest;

determining, by the sweet spot detection module, responses produced by the bat at each of the first region, the second region, the third region, and the fourth region during and after each of the plurality of shots is hit, by analysing the plurality of event-based data elements;

detecting and distinguishing, by the sweet spot detection module, a sweet spot shot from a non-sweet spot shot and an edge shot among the plurality of shots based on determined responses;

wherein the step of determining, by the sweet spot detection module, responses produced by the bat at each of the first region, the second region, the third region, and the fourth region, further includes:

computing a resultant acceleration of the bat during and after each of the plurality of shots for each of the first region, the second region, the third region, and the fourth region;

computing a change in the resultant acceleration of the bat after each of the plurality of shots for each of the first region, the second region, the third region, and the fourth region using a statistical metric, and wherein the statistical metric is standard deviation;

analysing a deviation in the resultant acceleration versus a deviation in the change in the resultant acceleration of the bat associated with each of the plurality of shots for each of the first region, the second region, the third region, and the fourth region; and analysing the deviation in the resultant acceleration between two axes of the bat associated with each of the plurality of shots for each of the first region, the second region, the third region, and the fourth region by generating one or more decision boundaries as a classifier for clustering the plurality of shots, and clustering the plurality of shots into two parts in each of the regions by generating said one or more decision boundaries as the classifier, and classifying each of the plurality of shots as the sweet spot shot, the non-sweet spot shot, and the edge shot.

8. The method according to claim 7, wherein the plurality of event-based data elements comprise acceleration and angular velocity of the bat while the bat is in motion, and vibrations generated on the bat after each of the plurality of shots.

9. The method according to claim 8, wherein each of the plurality of shots comprises an impact of the ball on the bat and is represented in terms of the acceleration in three dimensions and the angular velocity in three axes.

10. The method according to claim 7, comprises filtering out noise from the plurality of event-based data elements by a noise filter configured in any one of the sensor device, the user device, and the sweet spot detection server.

11. The method according to claim 7, comprises predicting one or more of the regions on the bat where the sweet spot shot is detected by a machine learning module based on the standard deviation in three axes, and wherein the machine learning module is configured in any one of the sensor device, the user device, and the sweet spot detection server.

* * * * *